(12) United States Patent
Hasegawa

(10) Patent No.: US 11,689,683 B2
(45) Date of Patent: Jun. 27, 2023

(54) IMAGE PROCESSING APPARATUS, FOR INCREASED AUTHENTICATION INFORMATION SECURITY FOR A CHAT SERVICE

(71) Applicant: CANON KABUSHIKI KAISHA, Tokyo (JP)

(72) Inventor: Kiichi Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/853,713

(22) Filed: Jun. 29, 2022

(65) Prior Publication Data

US 2022/0337723 A1 Oct. 20, 2022

Related U.S. Application Data

(63) Continuation of application No. 17/123,888, filed on Dec. 16, 2020, now Pat. No. 11,399,116.

(30) Foreign Application Priority Data

Dec. 20, 2019 (JP) .............................. JP2019-230919

(51) Int. Cl.
| | |
|---|---|
| *H04N 1/00* | (2006.01) |
| *H04N 1/44* | (2006.01) |
| *H04L 9/40* | (2022.01) |
| *G06F 3/14* | (2006.01) |
| *H04L 51/046* | (2022.01) |

(52) U.S. Cl.
CPC ............ *H04N 1/4426* (2013.01); *G06F 3/14* (2013.01); *H04L 51/046* (2013.01); *H04L 63/08* (2013.01); *H04N 1/00411* (2013.01); *H04N 1/00811* (2013.01)

(58) Field of Classification Search
None
See application file for complete search history.

(56) References Cited

U.S. PATENT DOCUMENTS

| | | | | |
|---|---|---|---|---|
| 2016/0050263 | A1* | 2/2016 | Hwang | H04L 51/04 709/204 |
| 2016/0050326 | A1* | 2/2016 | Lee | H04L 12/1822 358/402 |
| 2016/0124689 | A1* | 5/2016 | Nishino | H04N 1/4426 358/1.14 |
| 2016/0234135 | A1* | 8/2016 | Kim | H04L 51/08 |
| 2020/0099800 | A1* | 3/2020 | Noguchi | H04N 1/00204 |

(Continued)

*Primary Examiner* — Henok Shiferaw
(74) *Attorney, Agent, or Firm* — Canon U.S.A., Inc. IP Division

(57) ABSTRACT

A technique reduces the possibility of a leak of authentication information for a chat service. An image processing apparatus that communicates with a chat server configured to perform control to display received image data in a talk room of the chat server based on received information about the talk room includes a reception unit configured to receive predetermined information corresponding to a user by transmitting authentication information for the user logging in to a chat service to the chat server, a storage unit configured to store the predetermined information received by the reception unit, and a display unit configured to display the talk room that corresponds to the predetermined information and not to display the talk room that does not correspond to the predetermined information.

15 Claims, 19 Drawing Sheets

(56) References Cited

U.S. PATENT DOCUMENTS

| | | | | |
|---|---|---|---|---|
| 2021/0144266 A1* | 5/2021 | Tsukada | ............. | H04N 1/00212 |
| 2021/0160393 A1* | 5/2021 | Sugita | ................ | H04N 1/00472 |
| 2021/0195061 A1* | 6/2021 | Moriya | ................ | G06F 21/608 |
| 2022/0078292 A1* | 3/2022 | Nishiyama | ............ | H04N 1/0044 |
| 2022/0086109 A1* | 3/2022 | Ramirez | ................ | G06F 9/453 |

* cited by examiner

FIG.7

DATA CONFIGURATION OF MFP

| MFP-USER ID | APP-USER ID | AUTHENTICATION INFORMATION (TOKEN) |
|---|---|---|
| USER 1 | XXX | xx TOKEN 1 |
| USER 2 | YYY | xx TOKEN 2 |
| USER 3 | ZZZ | xx TOKEN 3 |
|  |  |  |
|  |  |  |

601 602 603 604

FIG.11A
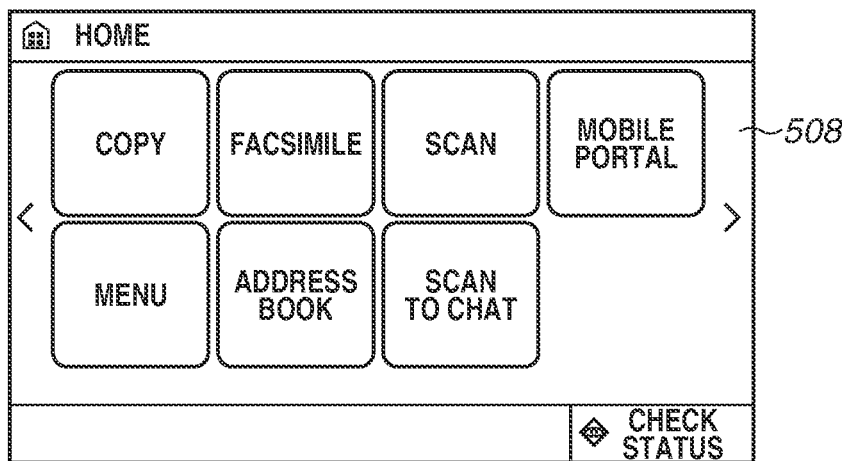
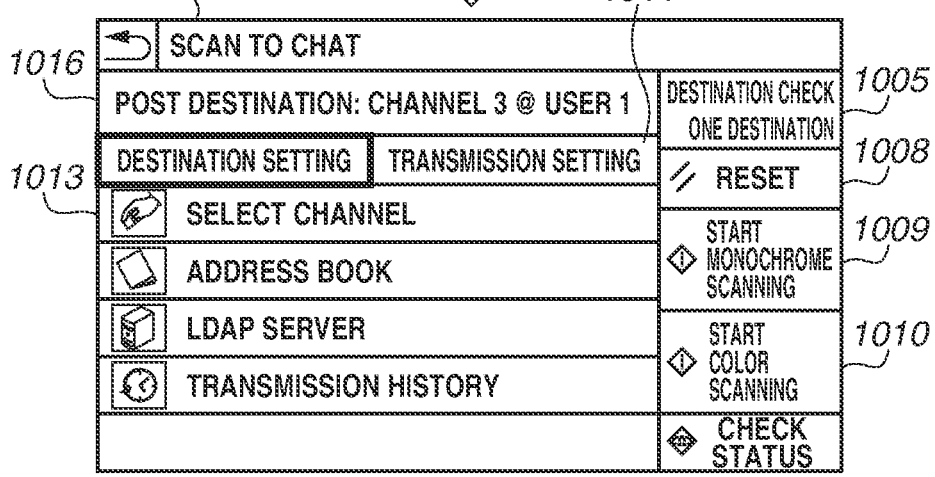
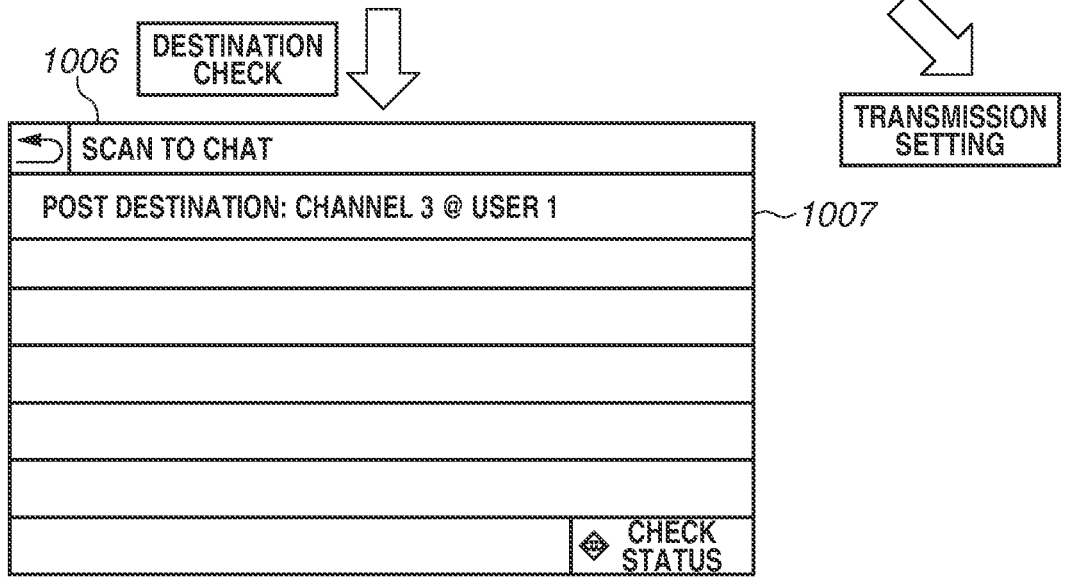

1015 — 1014 SCAN TO CHAT

CHANNEL SETTING →

- ☐ CHANNEL 1 ▽
- ☐ CHANNEL 3 ▽
- ■ CHANNEL 4 △
  - ■ USER 1
  - ☐ USER 2
  - ☐ USER 3

CHECK STATUS

↓ TRANSMISSION SETTING

1012 SCAN TO CHAT

| POST DESTINATION: CHANNEL 3 @ USER 1 | DESTINATION CHECK ONE DESTINATION |
| DESTINATION SETTING | TRANSMISSION SETTING | RESET |

1017 —
- READING SIZE: A4
- FILE FORMAT: PDF
- TITLE: TEST TRANSMISSION
- TITLE: THIS IS TEST TRANSMISSION
- FILE NAME: DOCUMENT

START MONOCHROME SCANNING

START COLOR SCANNING

CHECK STATUS

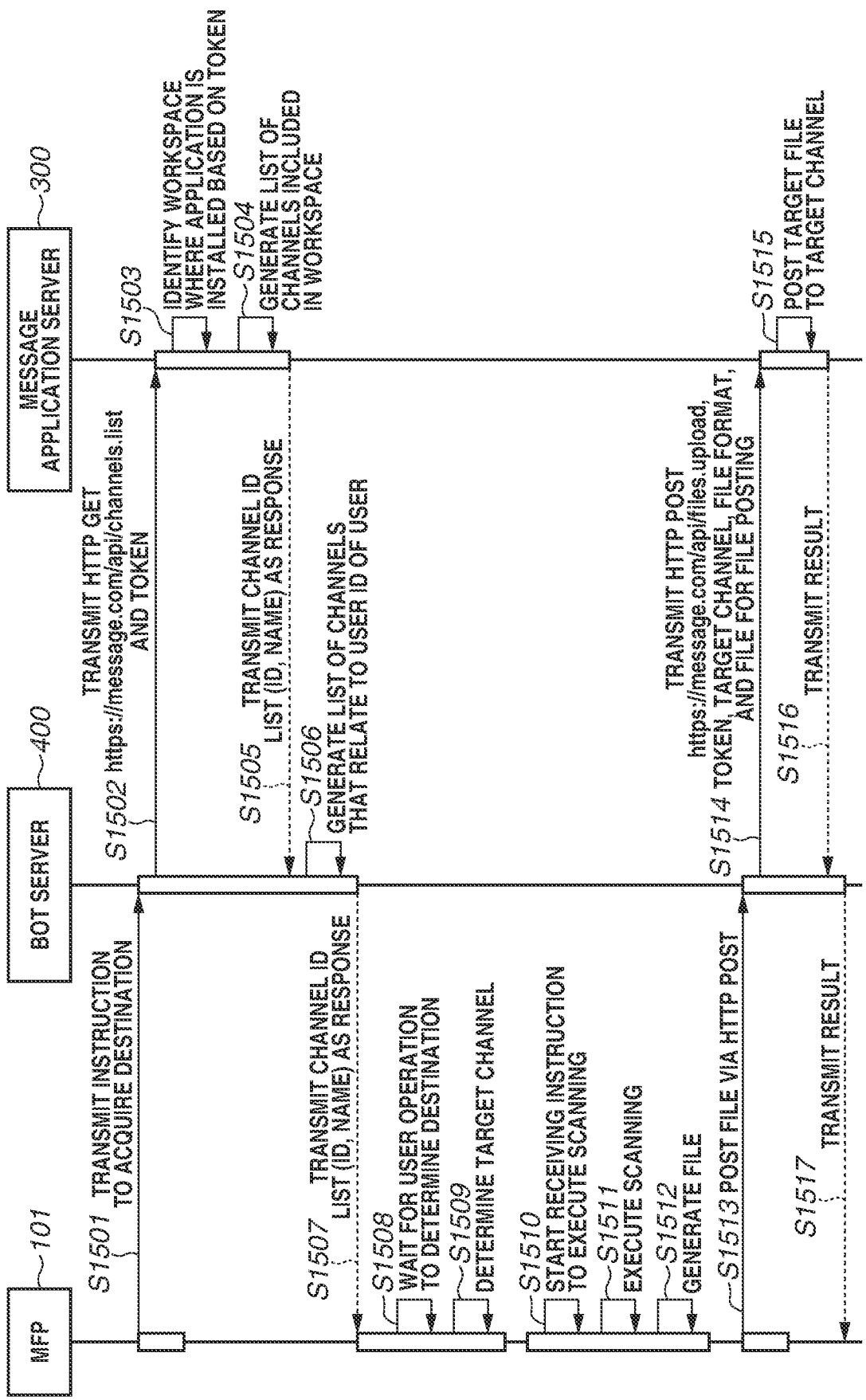

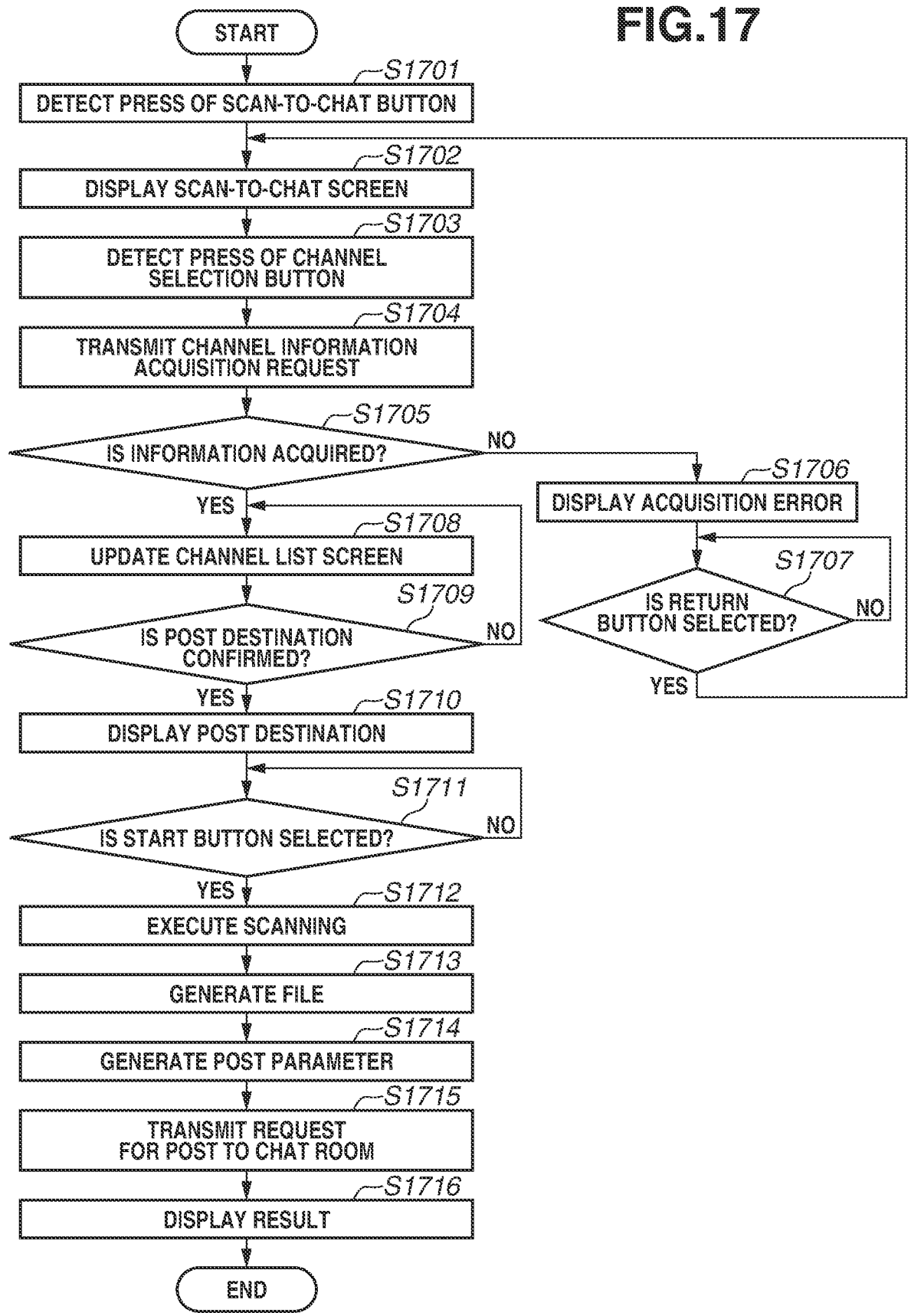

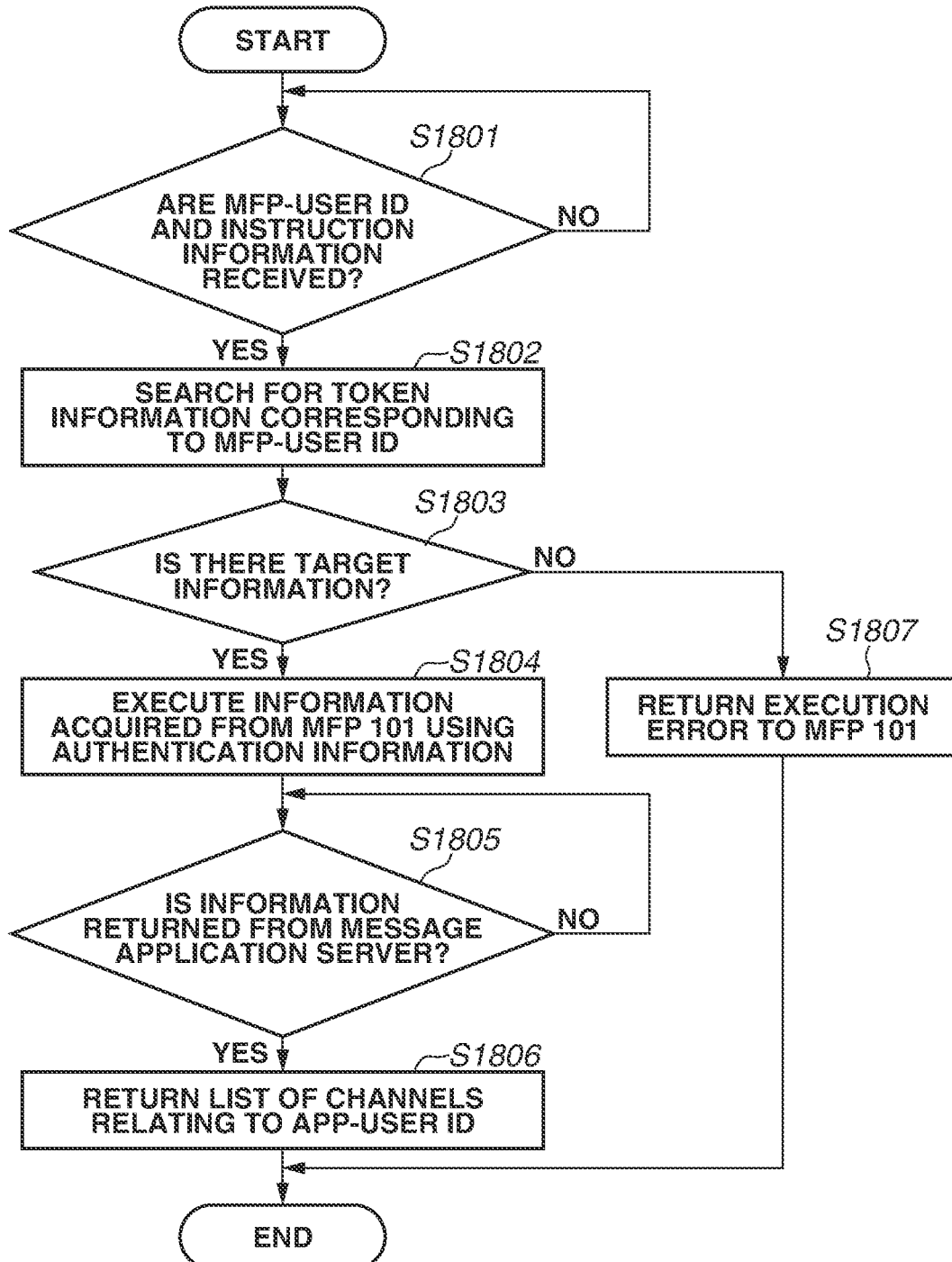

IMAGE PROCESSING APPARATUS, FOR INCREASED AUTHENTICATION INFORMATION SECURITY FOR A CHAT SERVICE

CROSS REFERENCE TO RELATED APPLICATIONS

The present application is a continuation of U.S. patent application Ser. No. 17/123,888, filed on Dec. 16, 2020, which claims priority from Japanese Patent Application No. 2019-230919, filed Dec. 20, 2019, each of which are hereby incorporated by reference herein in their entirety.

BACKGROUND

Field

The present disclosure relates to image processing apparatuses, control methods thereof, and storage media.

Description of the Related Art

Japanese Patent Application Laid-Open No. 2015-126318 discusses an image processing apparatus that transmits image data generated by scanning a document image to a file server on a network to share the image data.

In a case where a user uses a chat service available on the Internet and displays image data generated by scanning in a talk room of the chat service, the following issue arises. With an image processing apparatus that transmits generated image data to a file server via Server Message Block (SMB) communication as in Japanese Patent Application Laid-Open No. 2015-126318, it is difficult to designate a talk room of the chat service, so that the user cannot display the image data in a desired talk room.

Further, in a case where a user designates a talk room of a chat service using an image processing apparatus, if all talk rooms that are used in an organization are displayed, the user may need to search for a desired talk room from a large number of talk rooms and select it, and this is bothersome for the user. Thus, user identification information for a login to the image processing apparatus and user authentication information for the chat service may be stored in association in the image processing apparatus.

In a case where user authentication information for a chat service is stored in an image processing apparatus that is shared by a large number of users, a leak of the authentication information used in the chat service can occur.

Authentication information used in a chat service may be used in another service, so that a leak of authentication information for a login can lead to an unauthorized login in a service other than the chat service.

There is a need in the art for a technique that reduces the possibility of a leak of authentication information for a chat service while making it easy for users to search for talk rooms in designating a talk room to display image data generated by an image processing apparatus.

SUMMARY

According to an aspect of the present disclosure, an image processing apparatus that communicates with a chat server configured to perform control to display received image data in a talk room of the chat server based on received information about the talk room includes a reading unit configured to read an image of a document and to generate image data based on the image, a reception unit configured to receive predetermined information corresponding to a user that is generated by the chat server by transmitting authentication information for the user logging in to a chat service to the chat server, a storage unit configured to store the predetermined information received by the reception unit in association with identification information for the user logging in to the image processing apparatus, in place of the authentication information, and a display unit configured to display the talk room that corresponds to the predetermined information and not to display the talk room that does not correspond to the predetermined information.

Further features of the present disclosure will become apparent from the following description of exemplary embodiments with reference to the attached drawings.

BRIEF DESCRIPTION OF THE DRAWINGS

FIG. 7 illustrates an example of a table that associates various identifications (IDs) with token information.

FIGS. 11A and 11B illustrate an example of screen changes in a scan-to-chat process.

FIG. 16 illustrates an example of a sequence of transmitting a file generated by scanning by the MFP to the message application server via a bot server.

FIG. 17 is a flowchart illustrating an example of a scan-to-chat process that is performed via the bot server.

FIG. 18 is a flowchart illustrating an example of a process in transmitting image data to the message application server by the bot server.

DESCRIPTION OF THE EMBODIMENTS

Various exemplary embodiments of the present disclosure will be described below with reference to the drawings. It should be noted that each configuration described in the exemplary embodiments below is a mere example and the present disclosure is not limited to the illustrated configurations.

Figure 1:
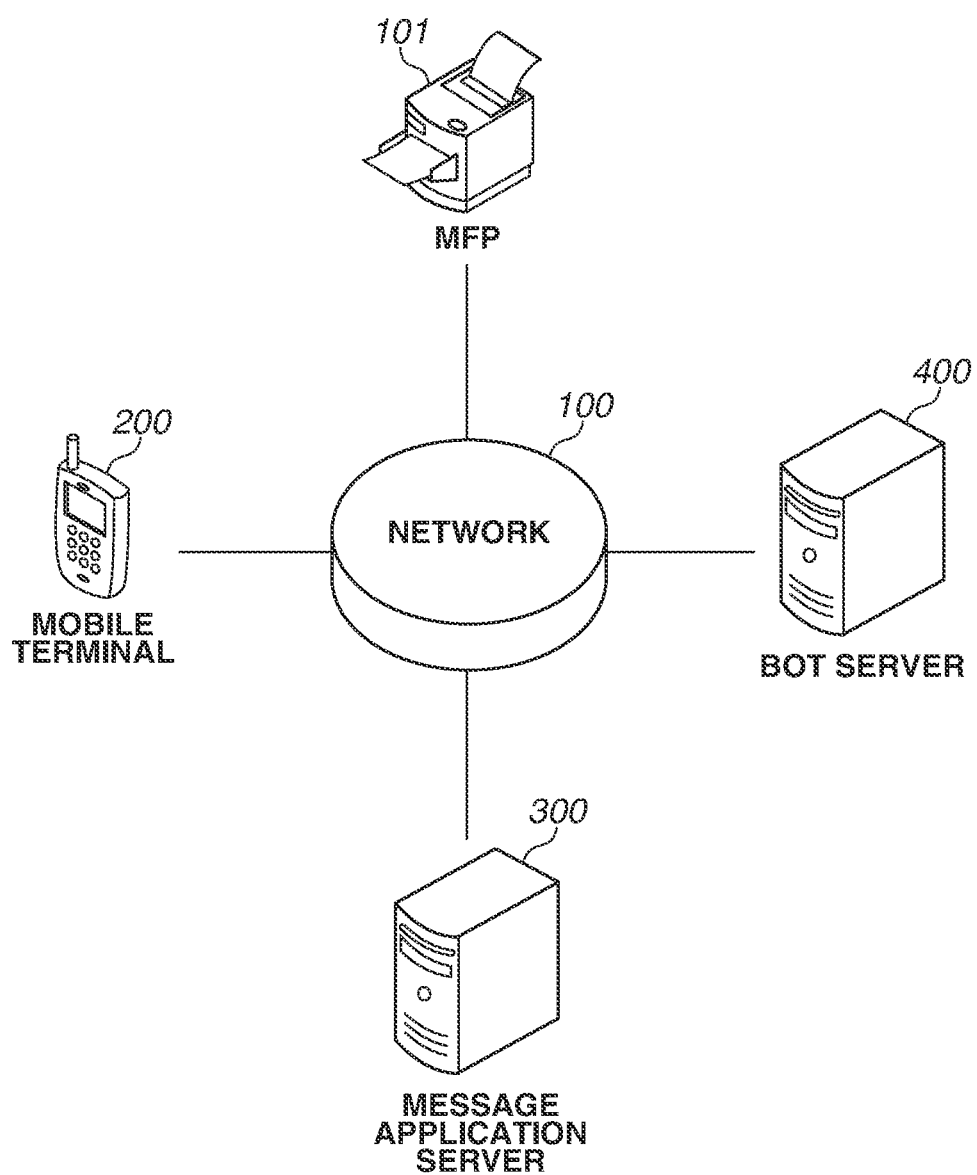
FIG. 1 illustrates an example of a system configuration according to an exemplary embodiment of the present disclosure.

FIG. 1 illustrates an example of a system configuration according to a first exemplary embodiment of the present disclosure. The system configuration according to the first exemplary embodiment includes a mobile terminal 200, a multi-function peripheral (MFP) 101, and a message application server 300. The mobile terminal 200 is an example of terminal apparatuses. The MFP 101 is an image processing apparatus that communicates with the mobile terminal 200 via a network 100. Further, a bot server 400 is also connected via the network 100. The message application server 300 is a chat server that receives messages and image data transmitted from the MFP 101 and the mobile terminal 200 and manages a chat service to display received messages and image data on the mobile terminal 200 and a personal computer (PC) (not illustrated) based on user operations. The bot server 400 performs association with information (token information) corresponding to a bot application installed in the message application server 300 connected to the MFP 101 and transmits a request from the MFP 101 to the message application server 300. The network 100 according to the present exemplary embodiment can be the Internet or a local area network (LAN). Further, the network 100 can be a wired network or a wireless network.

Figure 2:
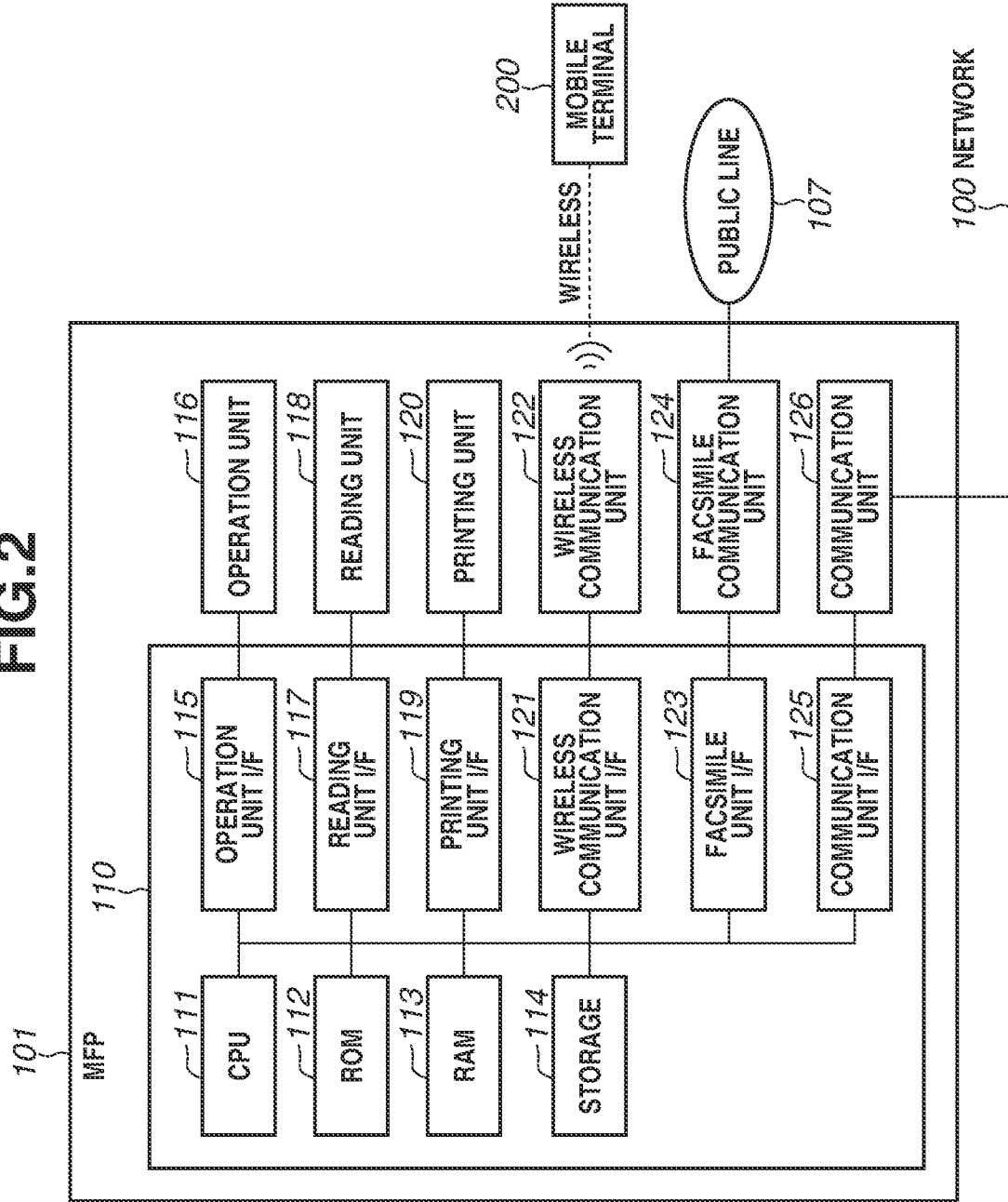
FIG. 2 illustrates an example of a hardware configuration of a multi-function peripheral (MFP).

FIG. 2 illustrates an example of a hardware configuration of the MFP 101. The MFP 101 includes a central processing unit (CPU) 111, a read-only memory (ROM) 112, a random access memory (RAM) 113, a storage 114, an operation unit interface (operation unit I/F) 115, an operation unit 116, a reading unit interface (reading unit I/F) 117, a reading unit 118, a printing unit interface (printing unit I/F) 119, a printing unit 120, a wireless communication unit interface (wireless communication unit I/F) 121, and a wireless communication unit 122. The MFP 101 further includes a facsimile unit interface (facsimile unit I/F) 123, a facsimile communication unit 124, a communication unit interface (communication unit I/F) 125, and a communication unit 126.

A control unit 110 including the CPU 111 controls an entire operation of the MFP 101. The CPU 111 reads control programs stored in the ROM 112 or the storage 114 onto the RAM 113 and performs various types of control such as reading control and printing control. The ROM 112 stores the control programs that are executable by the CPU 111. The ROM 112 also stores a boot program and font data. The RAM 113 is a main storage memory and is used as a work area and a temporary storage area for loading of various control programs stored in the ROM 112 and the storage 114. The storage 114 stores image data, print data, various programs, and various types of setting information. While the storage 114 is a flash memory in the present exemplary embodiment, an auxiliary storage apparatus such as a solid state drive (SSD) or hard disk drive (HDD) can be used. Further, an embedded MultiMedia card (eMMC) can be used.

While one CPU 111 executes processes illustrated in flowcharts described below using one memory (RAM 113) in the MFP 101 according to the present exemplary embodiment, the present exemplary embodiment is not limited to that described above. For example, a plurality of CPUs, a plurality of RAMs, a plurality of ROMs, and a plurality of storages can execute the processes illustrated in the flowcharts in cooperation with one another. Further, part of the processes can be executed using a hardware circuit such as an application-specific integrated circuit (ASIC) or field-programmable gate array (FPGA).

The operation unit I/F 115 connects the control unit 110 and the operation unit 116 including, for example, a display unit such as a touch panel and hardware keys. The operation unit 116 displays information to a user and detects user input.

The reading unit I/F 117 connects the control unit 110 and the reading unit 118, such as a scanner. The reading unit 118 reads a document image, and the CPU 111 converts the read image into image data such as binary data. The image data generated based on the image read by the reading unit 118 is transmitted to an external apparatus or printed on a recording sheet.

The printing unit I/F 119 connects the control unit 110 and the printing unit 120 such as a printer. The CPU 111 transfers image data (print data) stored in the RAM 113 to the printing unit 120 via the printing unit I/F 119. The printing unit 120 prints an image based on the transferred image data onto a recording sheet fed from a sheet feeding cassette.

The wireless communication unit I/F 121 is an interface (I/F) for controlling the wireless communication unit 122. The wireless communication unit I/F 121 wirelessly connects the control unit 110 to an external wireless device (mobile terminal 200 in the present exemplary embodiment).

The control unit 110 is connected to a public line 107 by the facsimile unit I/F 123 by controlling the facsimile communication unit 124 such as a facsimile. The facsimile unit I/F 123 is an I/F for controlling the facsimile communication unit 124. The facsimile unit I/F 123 connects to the public line 107 and controls facsimile communication protocols by controlling a modem and a network control unit (NCU) for facsimile communication.

The communication unit I/F 125 connects the control unit 110 and the network 100. With the communication unit I/F 125, the communication unit 126 transmits image data and various types of internal apparatus information to an external apparatus on the network 100 and receives print data and information on the network 100 from an information processing apparatus on the network 100. Methods of transmission and reception via the network 100 are email transmission/reception and file transmission using other protocols (e.g., File Transfer Protocol (FTP), Server Message Block (SMB), Web Distributed Authoring and Versioning (WEBDAV)). Further, image data and various types of setting data can be transmitted and received via the network 100 by access via Hypertext Transfer Protocol (HTTP) communication from the mobile terminal 200, the message application server 300, and the bot server 400.

Figure 3:
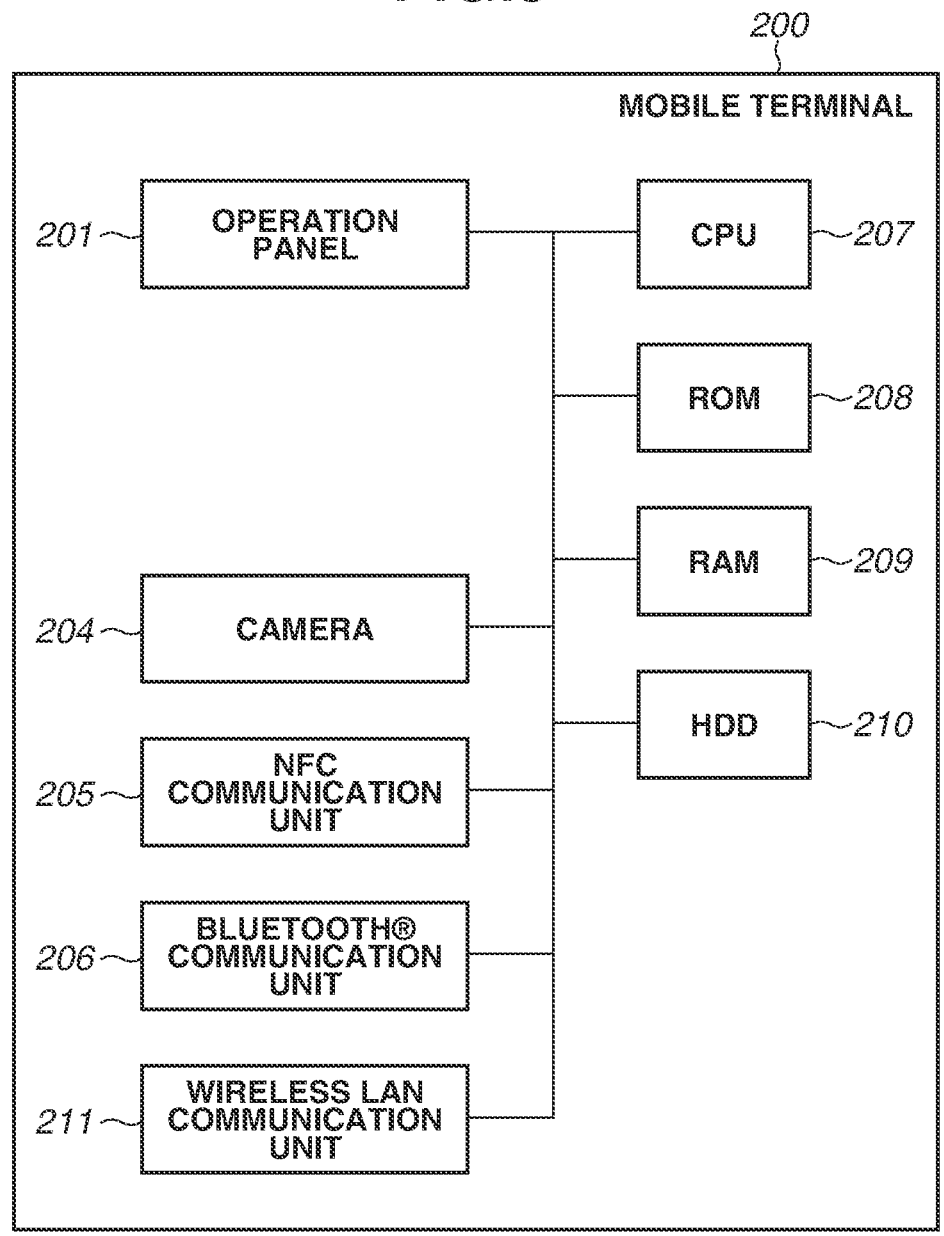
FIG. 3 illustrates an example of a hardware configuration of a mobile terminal.

FIG. 3 illustrates an example of a hardware configuration of the mobile terminal 200. While the mobile terminal 200 is an apparatus such as a smartphone or a tablet PC in the present exemplary embodiment, the mobile terminal 200 can be any other apparatus that is an information processing apparatus capable of performing Wi-Fi communication.

A CPU 207 reads control programs stored in a ROM 208 and executes various types of processing to control operations of the mobile terminal 200. The ROM 208 stores the control programs. A RAM 209 is used as a main memory of the CPU 207 and a temporary storage area such as a work area. A HDD 210 stores various types of data such as images and electronic documents.

An operation panel 201 includes a touch panel function that detects user touch operations, and displays various screens provided by an operating system (OS) and email transmission applications. Further, the operation panel 201 is used to check information stored in the message application server 300. A user can input a desired operation instruction to the mobile terminal 200 by inputting a touch operation to the operation panel 201. The mobile terminal 200 includes hardware keys (not illustrated), and a user can input an operation instruction to the mobile terminal 200 using the hardware keys.

A camera 204 captures an image based on an image capturing instruction from a user. The image captured by the camera 204 is stored in a predetermined area of the HDD 210. Further, information can be acquired from a QR Code® read by the camera 204 using a program that analyzes QR Codes®.

The mobile terminal 200 transmits and receives data to and from various peripheral devices via a Near-Field-Communication (NFC) communication unit 205, a Bluetooth® communication unit 206, and a wireless LAN communication unit 211. The Bluetooth® communication unit 206 of the mobile terminal 200 can support Bluetooth® Low Energy.

Figure 4:
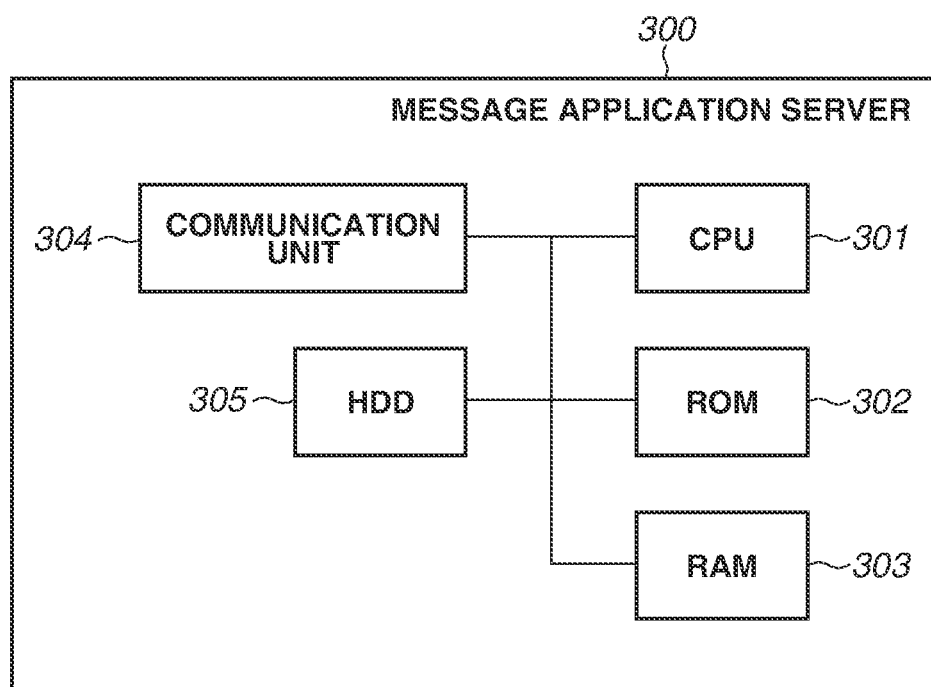
FIG. 4 illustrates an example of a hardware configuration of a message application server.

FIG. 4 illustrates an example of a hardware configuration of the message application server 300. A CPU 301 reads control programs stored in a ROM 302 and performs various types of processing to control operations of the message application server 300. The ROM 302 stores the control programs. A RAM 303 is used as a main memory of the CPU 301 and a temporary storage area such as a work area. A HDD 305 stores various types of data such as messages, images, and channel information. The message application server 300 transmits and receives data to and from various devices such as the mobile terminal 200 and the MFP 101 via a communication unit 304. The communication unit 304 can perform wired communication using Ethernet® or wireless communication such as Wi-Fi communication.

In a case where a user uses a chat service available on the Internet and displays image data generated by scanning in a talk room of the chat service, the following issue arises. With an image processing apparatus that transmits generated image data to a file server via SMB communication as in Japanese Patent Application Laid-Open No. 2015-126318, it is impossible to designate a talk room of the chat service, so that the user cannot display the image data in a desired talk room.

Further, in a case where a user designates a talk room of a chat service using an image processing apparatus, if all talk rooms that are used in an organization are displayed, the user may need to search for a desired talk room from a large number of talk rooms and select it, and this is inconvenient for the user. Thus, it is conceivable that user identification information for a login to the image processing apparatus and user authentication information for the chat service are stored in association in the image processing apparatus.

In a case where user authentication information for a chat service is stored in an image processing apparatus that is shared by a large number of users, a leak of the authentication information used in the chat service can occur.

Authentication information used in a chat service may be used in another service, so that a leak of authentication information for a login can lead to an unauthorized login in a service other than the chat service. The following processing is executed to solve the above-described issues.

Figure 5:
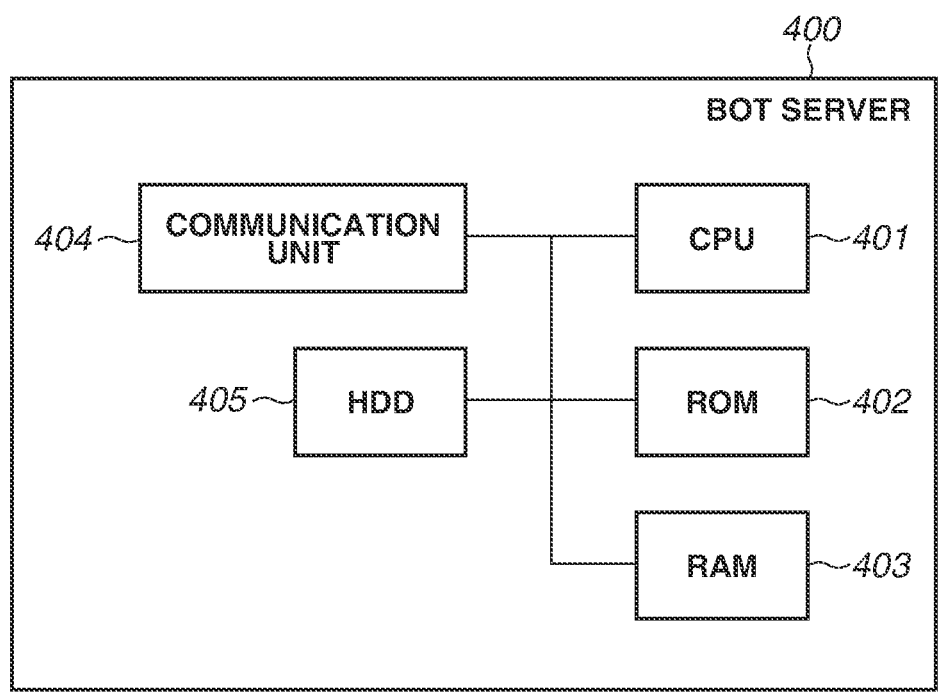
FIG. 5 illustrates an example of a hardware configuration of a bot server.

FIG. 5 illustrates an example of a hardware configuration of the bot server 400. A CPU 401 reads control programs stored in a ROM 402 and performs various types of processing to control operations of the message application server 300. A ROM 402 stores the control programs. A RAM 403 is used as a main memory of the CPU 401 and a temporary storage area such as a work area. A HDD 405 stores various types of data such as messages, image data, and channel information. The bot server 400 transmits and receives data to/from various devices such as the mobile terminal 200, the MFP 101, and the message application server 300 via a communication unit 404.

Figure 6:
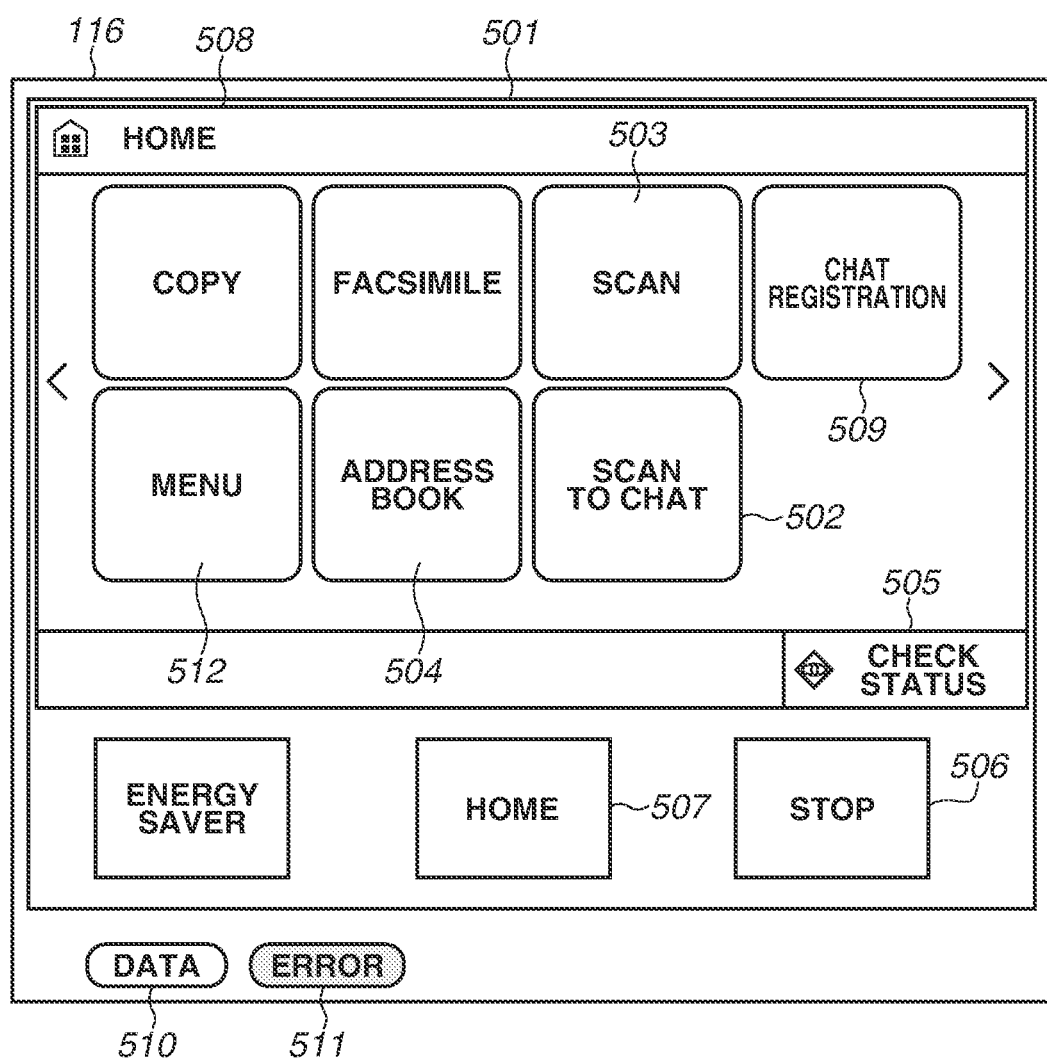
FIG. 6 illustrates an example of a home screen that is displayed on an operation unit of the MFP.

FIG. 6 illustrates an example of a home screen displayed on the operation unit 116 of the MFP 101. The operation unit 116 includes a touch panel 501 and light emitting diodes (LEDs) 510 and 511. The touch panel 501 displays an operation screen. The touch panel 501 is an instruction unit and functions as a reception unit that receives user instructions and also as a display unit that displays a screen. A user directly touches a screen displayed on the touch panel 501 with a finger of the user or an object such as a stylus and inputs an instruction to execute a function based on the displayed screen.

In FIG. 6, the touch panel 501 displays a home screen 508. The home screen 508 is the first screen for inputting an instruction to execute a function of the MFP 101, and a screen to be displayed for various settings of a function of the MFP 101, such as a copy, facsimile, scan, or medium print function, is selected on the home screen 508.

A status check button 505 is an object for displaying a screen (status check screen) for checking the state of the MFP 101. A transmission history and a job execution history can be displayed on the status check screen (not illustrated).

A scan-to-chat button 502 is an object for displaying a scan-to-chat processing setting screen. If the scan-to-chat button 502 is selected by a user, a scan-to-chat screen 1004 illustrated in FIG. 11A is displayed on the operation unit 116. Details of scan-to-chat processing will be described below with reference to FIGS. 12 and 13.

A chat registration button 509 is an object for displaying a screen for a setting to associate authentication information used in the MFP 101 with authentication information used in the message application server 300. The authentication information used in the MFP 101 is, for example, information that a user inputs to log in to the MFP 101, and is a combination of a user identification (user ID) (or username) and a password. Further, the authentication information used in the message application server 300 is information that a user inputs to log in to a message service, and is a combination of a user ID (or username) and a password.

Figure 9:
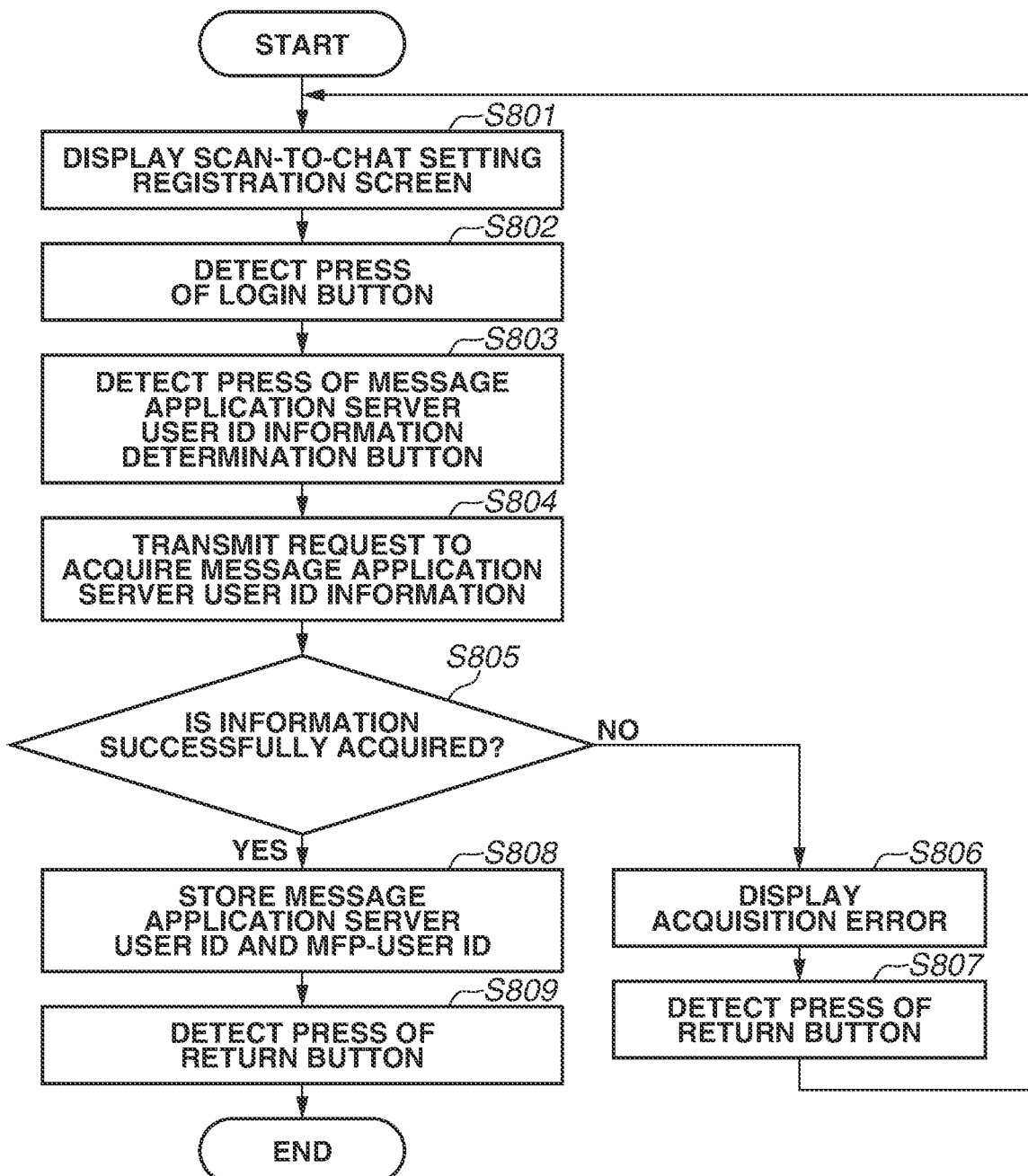
FIG. 9 is a flowchart illustrating a process of generating the table illustrated in FIG. 7 by the MFP.
Figure 10:
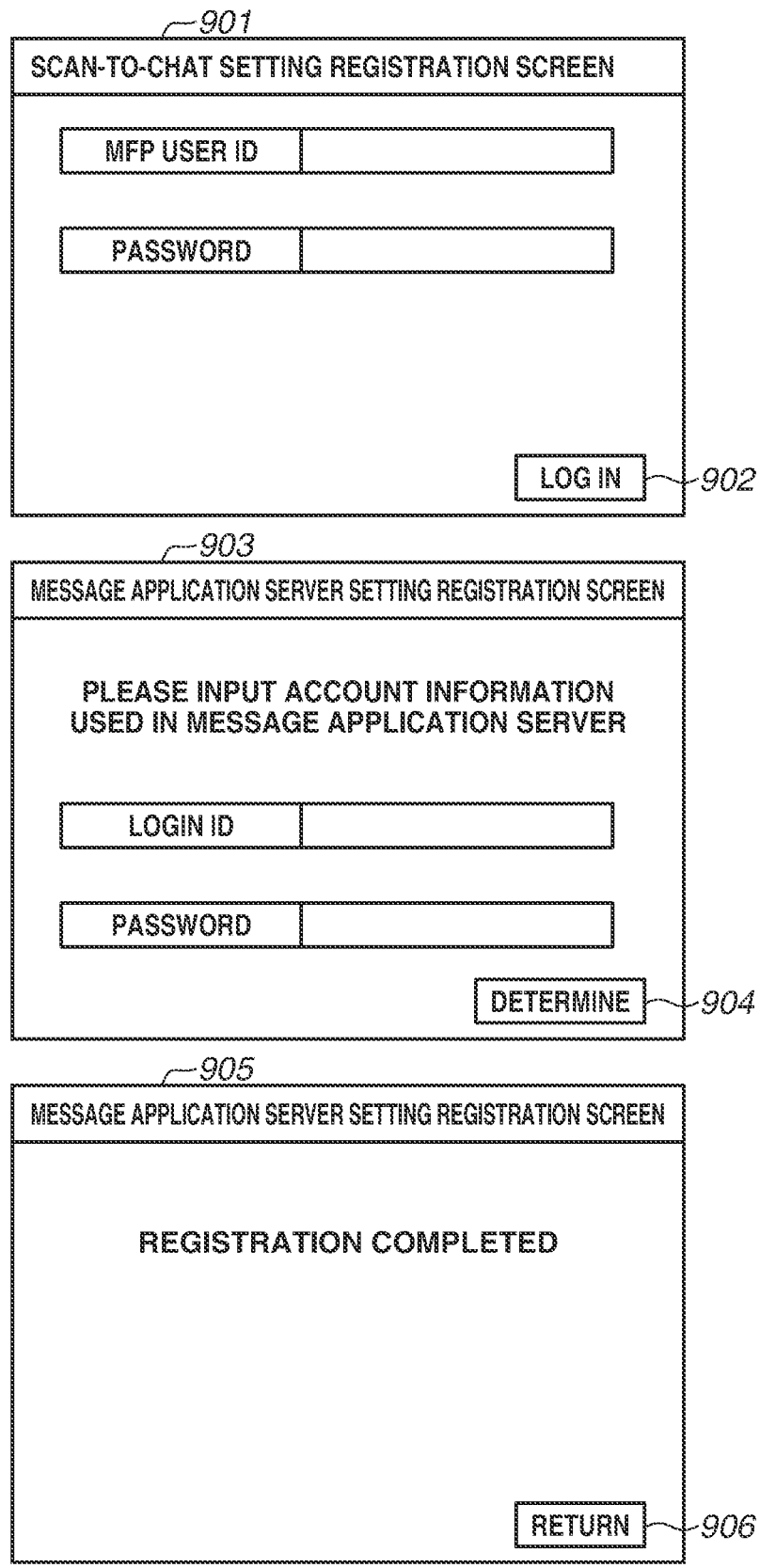
FIG. 10 illustrates an example of an identification (ID) setting registration screen.

If the chat registration button 509 is selected by a user, a setting screen 901 illustrated in FIG. 10 is displayed on the operation unit 116. Details of chat registration processing will be described below with reference to FIGS. 8 and 9.

A scan button 503 is an object for displaying a scan selection screen (not illustrated) from the MFP 101. The scan selection screen is a screen for selecting a transmission function, such as electronic mail transmission (email), SMB, FTP, or HTTP file transmission, or Internet facsimile (I-facsimile) transmission. If a displayed object indicating a transmission function is touched, a setting screen for the transmission function is displayed.

An address book button 504 is an object for displaying an address book screen of the MFP 101 when selected by a user. The LEDs 510 and 511 notify a user of the state of the MFP 101. The LED 510 is on during email or print job reception or execution. The LED 511 is turned on if an error occurs in the MFP 101. A stop button 506 is an object for cancelling an operation and is always displayed on the operation unit 116. A home button 507 is an object for displaying the home screen 508 and is always displayed on the operation unit 116. A menu button 512 is an object for displaying a screen for setting preferences, such as a language to be used, and various functions.

FIG. 7 illustrates an example of a table 601 that associates and stores authentication information used in the MFP 101 and authentication information used in the message service.

Figure 8:
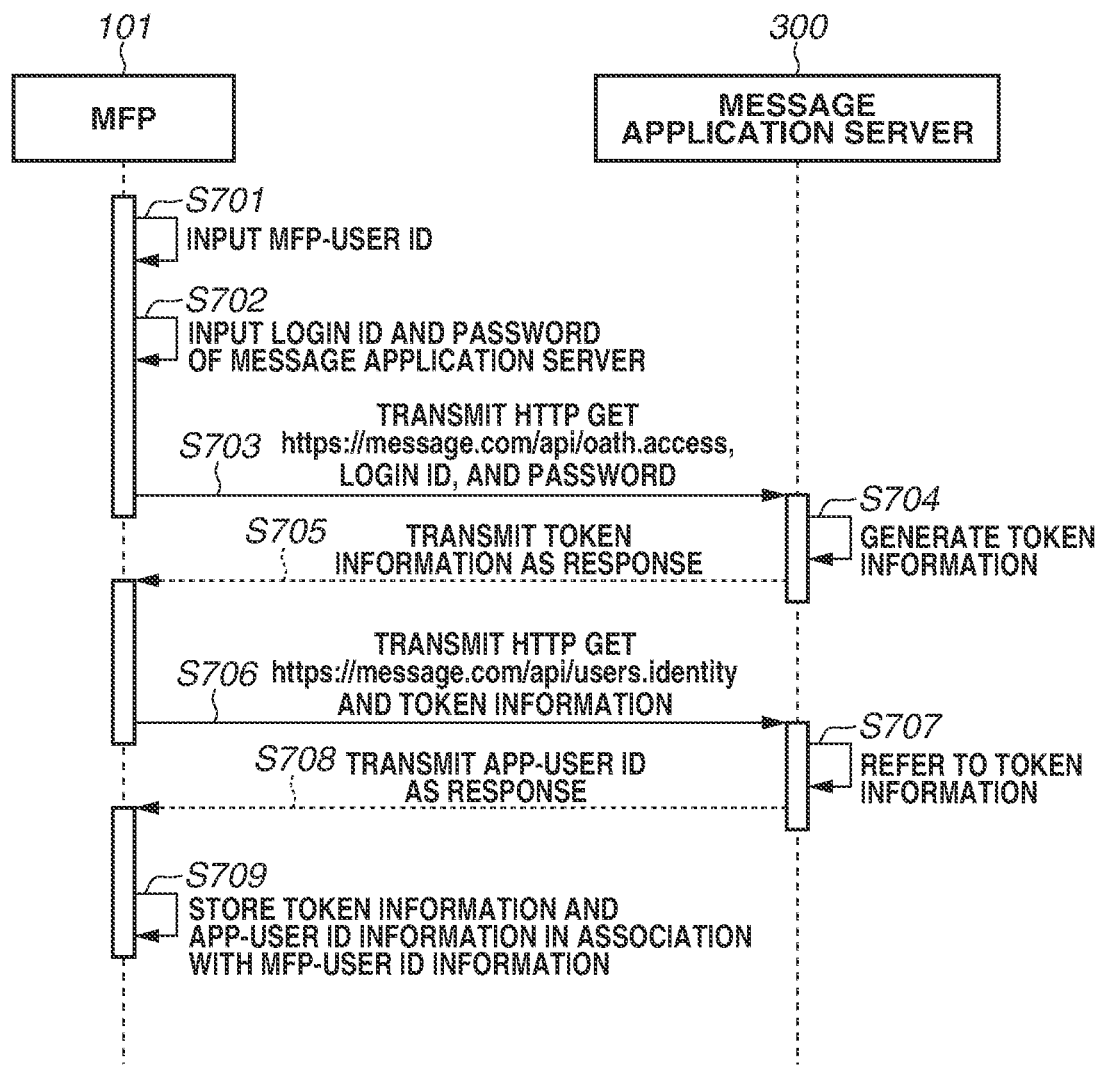
FIG. 8 illustrates an example of a sequence of generating the table illustrated in FIG. 7 by the MFP.

In the present exemplary embodiment, the table 601 is stored in the storage 114 in the MFP 101 by a sequence illustrated in FIG. 8.

An MFP-user ID 602 is a part (user ID) of authentication information required when a user logs in to the MFP 101. Further, an APP-user ID 603 is information that corresponds to an account on the message service, and a different APP-user ID 603 is associated with each user. Token information 604 is information for designating a workspace managed by the message application server 300. For example, by transmitting the token information 604 to the message application server 300, the MFP 101 acquires information about a workspace that corresponds to the token information 604. In the table 601 in FIG. 7, the MFP-user ID 602, the APP-user ID 603, and the token information 604 are stored in association.

FIG. 8 illustrates an example of a sequence of generating the table 601 by the MFP 101. The sequence is started when the chat registration button 509 displayed on the home screen 508 is selected. Further, the sequence is executed by the CPU 111 of the MFP 101 by reading a program stored in the ROM 112 onto the RAM 113.

In step S701, the CPU 111 of the MFP 101 inputs the MFP-user ID 602 and a password via an input screen 901 in FIG. 10 displayed on the operation unit 116. In a case where a login requires the MFP-user ID 602 that is input in using the MFP 101, if the input MFP-user ID 602 is stored in the RAM 113, step S701 can be skipped. If a login button 902 on the input screen 901 is selected, the processing proceeds to step S702.

In step S702, the CPU 111 of the MFP 101 receives the user input operation via an input screen 903 in FIG. 10 displayed on the operation unit 116, inputs a login ID and a password of the message application server 300, and stores the login ID and the password in the RAM 113. The input login ID is information different from the APP-user ID 603. If an determination button 904 of the input screen 903 is selected, the processing proceeds to step S703.

Further, the login ID and the password of the message service may be used in, for example, a web mail service, a cloud storage service, and/or other message services. Thus, a leak of the login ID and the password of the message service is undesirable.

In step S703, the CPU 111 of the MFP 101 transmits a request to acquire the token information 604 to the message application server 300 via HTTP communication. Specifically, information that indicates a request to generate token information based on the login ID and the password that are input in step S702 and return the generated token information is transmitted to the message application server 300. An example of a command to be transmitted is "HTTP GET https://message.com/api/oath.access". The uniform resource locator (URL) "https://message.com/api/oath.access" in the command is a URL for access to the message application server 300 and is pre-registered in the MFP 101 by a user. The login ID and the password that are input in step S702 are transmitted to the URL so that the message application server 300 performs step S704 of generating a token.

In step S704, the CPU 301 of the message application server 300 generates the token information 604 using the login ID and the password that are received via the communication unit 304. The token information 604 generated in step S704 is stored in association with the APP-user ID 603 and the workspace in the message application server 300. Thus, if the message application server 300 receives the token information 604 from the MFP 101, the APP-user ID 603 and the workspace are identified.

In step S705, the CPU 301 of the message application server 300 controls the communication unit 304 and transmits the token information 604 as HTTP communication response information to the MFP 101.

In step S706, the CPU 111 of the MFP 101 transmits a request to acquire the APP-user ID 603 to the message application server 300 via HTTP communication. Specifically, information indicating a request for the APP-user ID 603 corresponding to the token information 604 acquired in step S705 is transmitted to the message application server 300. An example of a command to be transmitted is "HTTP GET https://message.com/api/users.identity". As in the command used in step S703, the URL in the command is a URL for access to the message application server 300. If the token information 604 is transmitted to the URL, the message application server 300 executes step S707 to search for the APP-user ID 603 corresponding to the token information 604.

In step S707, the CPU 301 of the message application server 300 refers to the token information 604 received via the communication unit 304 and searches the HDD 305 for the APP-user ID 603 contained in the token information 604.

In step S708, the CPU 301 of the message application server 300 controls the communication unit 304 and transmits the APP-user ID 603 as HTTP communication response information to the MFP 101.

In step S709, the CPU 111 of the MFP 101 stores the received token information 604 and the received APP-user ID 603 in the storage 114 in association with the MFP-user ID 602 input in step S701 as illustrated in the table 601. If the processing of step S709 is completed, the login ID and the password of the message application server 300 that are input in step S702 are erased from the RAM 113.

FIG. 9 illustrates an example of a process of generating the table 601 by the MFP 101. The process is started at the press of the chat registration button 509 on the home screen 508. Further, the CPU 111 of the MFP 101 reads a program stored in the ROM 112 onto the RAM 113 to thereby execute the process illustrated in FIG. 9.

In step S801, the CPU 111 of the MFP 101 displays the input screen 901, which is a screen for receiving the MFP-user ID 602, on the touch panel 501.

In step S802, if the CPU 111 of the MFP 101 detects the selection of the login button 902 of the input screen 901 via the operation unit 116, the input MFP-user ID 602 is stored in the RAM 113. Further, the CPU 111 displays the input screen 903 for receiving the login ID and the password of the message application server 300 on the touch panel 501.

In step S803, if the CPU 111 of the MFP 101 detects the selection of the determination button 904 via the operation unit 116, the input login ID and the input password information are stored in the RAM 113, and the processing proceeds to step S804.

In step S804, the CPU 111 of the MFP 101 transmits a request to acquire the APP-user ID 603 to the message application server 300 using the input login ID and the input password.

In step S805, the CPU 111 of the MFP 101 determines whether the APP-user ID 603 is successfully acquired from the message application server 300. In a case where the CPU 111 of the MFP 101 determines that the APP-user ID 603 is successfully acquired (YES in step S805), the processing proceeds to step S808. On the other hand, in a case where the CPU 111 of the MFP 101 determines that the APP-user ID 603 is not acquired (NO in step S805), the processing proceeds to step S806.

In step S806, the CPU 111 of the MFP 101 displays an indication of the acquisition error on the touch panel 501. While a message indicating successful acquisition is displayed on a completion screen 905 illustrated in FIG. 10, the message displayed on the completion screen 905 is changed to a message indicating the acquisition error, and the completion screen 905 with the changed message is displayed.

In step S807, if the CPU 111 of the MFP 101 detects the press of a return button (not illustrated) displayed on the touch panel 501, the displayed screen is changed to the input screen 901, which is an initial screen, and the processing returns to step S801.

In step S808, the CPU 111 of the MFP 101 generates a table using the MFP-user ID 602 and the APP-user ID 603 stored in the RAM 113 and stores the generated table in the storage 114. Further, the MFP 101 displays the completion screen 905 on the touch panel 501.

In step S809, if the CPU 111 of the MFP 101 detects the press of a return button 906 via the operation unit 116, the displayed screen is changed to the home screen 508, and the process ends.

FIGS. 11A and 11B illustrate an example of screen changes in the scan-to-chat processing. If the scan-to-chat button 502 displayed on the home screen 508 is selected, the scan-to-chat screen 1004 is displayed on the touch panel 501.

On the scan-to-chat screen 1004, a destination check button 1005 is displayed. The destination check button 1005 displays the number of destinations set as a post destination of image data generated by scanning. In the present exemplary embodiment, a case where one channel that is a post destination is selected on the destination check button 1005 will be described below as an example. In a case where a plurality of destinations is selected, the number of set post destinations is displayed as the number of destinations.

If the destination check button 1005 is selected, a scan-to-chat destination check screen 1006 is displayed. The scan-to-chat destination check screen 1006 displays a transmission setting post destination set by selecting a channel selection button 1013. A post destination button 1007 performs display of only the number of post destinations that are set at this time point, and the scan-to-chat destination check screen 1006 that displays the set post destinations (destinations) is displayed by user selection. Further, if the post destination button 1007 is set, a details screen (not illustrated) is displayed, and details of the set post destination are displayed.

While only one post destination is displayed on the scan-to-chat destination check screen 1006 in the present exemplary embodiment, the present exemplary embodiment is not limited to that described above. For example, the MFP 101 can set a plurality of post destinations from the message application server 300 so that a plurality of post destination buttons 1007 is displayed on the scan-to-chat destination check screen 1006.

In a case where a reset button 1008 is selected on the scan-to-chat screen 1004, the set information is cleared. At this time, the set destination information is cleared. Further, in a case where a monochrome scanning start button 1009 or a color scanning start button 1010 is selected on the scan-to-chat screen 1004, a scan and transmission process is started.

If a transmission setting button 1011 is selected, a transmission setting screen 1012 is displayed. On the transmission setting screen 1012, transmission settings such as a file format 1017 can be changed and/or checked.

If the channel selection button 1013 is selected, a channel selection screen 1014 is displayed. Channels and users are displayed on the channel selection screen 1014 based on channel list information received from the message application server 300 by the MFP 101. In the present exemplary embodiment, not all the channels contained in the received channel list information but only the channels to which an account used on the message service by the user having logged in to the MFP 101 belongs are displayed.

On the channel selection screen 1014, a post destination channel can be selected, and a user to be notified can be selected from the users belonging to the selected channel. Specifically, a channel to post and a user to be mentioned are selected. If a channel button is selected, a pull-down menu of the users belonging to the selected channel is displayed. On the channel selection screen 1014, both a channel and a user can be selected, or only a channel can be selected in order to perform posting to all the users belonging to the selected channel. Further, a plurality of channels can be selected, or a single channel can be selected and a plurality of users in the selected channel can be selected. Further, a plurality of channels can be selected and different users respectively belonging to the selected channels can be selected.

If a return button 1015 is selected, information about the selected channel is stored, and the scan-to-chat screen 1004 is displayed again. At this time, "post destination channel 3 @ user 1" indicating the name of the channel selected as a post destination and the name of the user to be notified is displayed in a post destination section 1016. Further, the CPU 111 of the MFP 101 stores the post destination based on the channel and the user set at this time in the RAM 113 or the storage 114.

Figure 12:
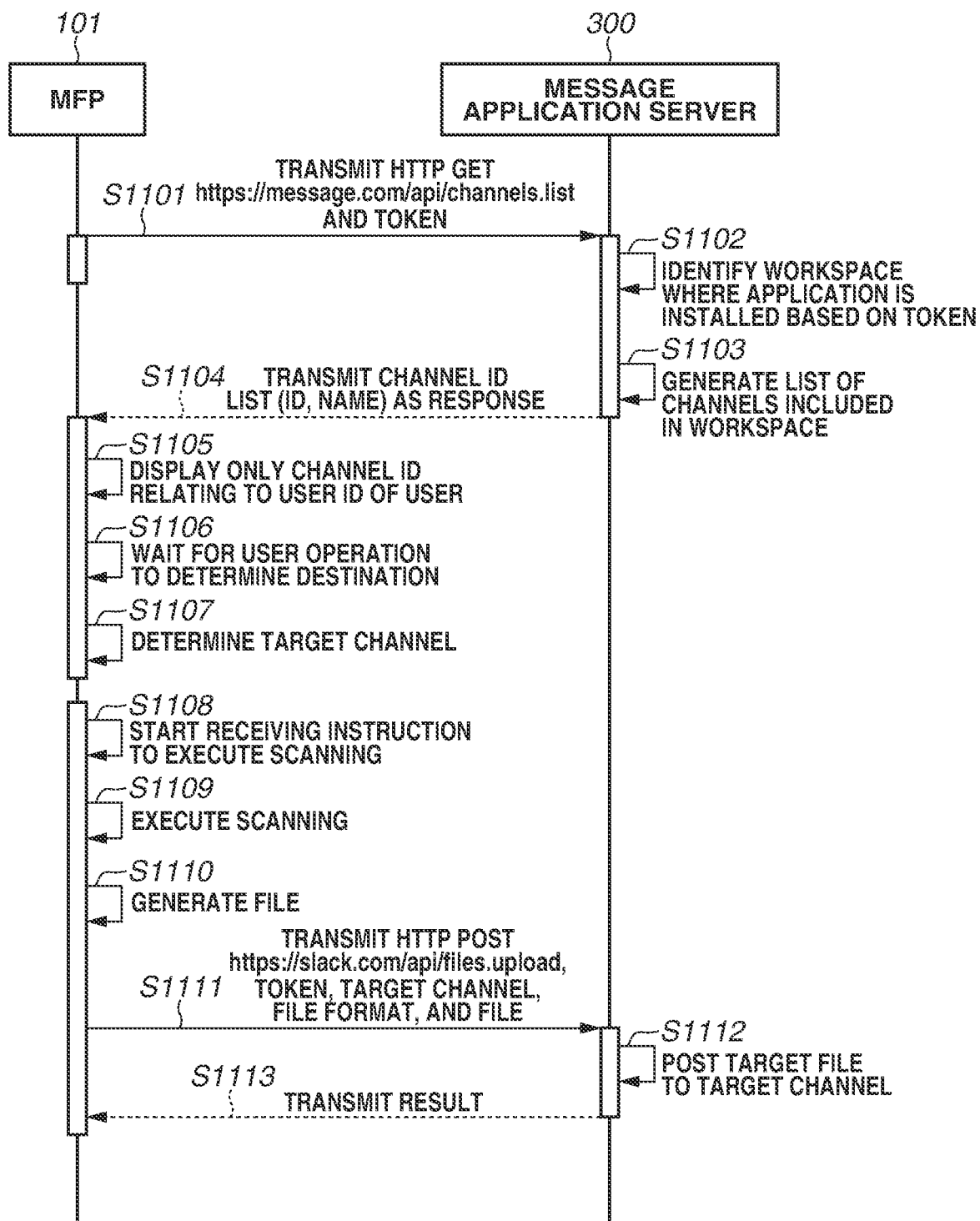
FIG. 12 illustrates an example of a sequence of transmitting a file generated by scanning by the MFP to the message application server.

FIG. 12 illustrates an example of a sequence of transmitting a file generated by scanning by the MFP 101 to the message application server 300. The sequence illustrated in FIG. 12 is started when the channel selection button 1013 on the scan-to-chat screen 1004 in FIG. 11A is selected. The sequence is started in a state where the MFP-user ID 602 of users and the token information 604 are stored in association in the storage 114 and a user has logged in to the MFP 101.

In step S1101, the CPU 111 of the MFP 101 controls the communication unit 126 and transmits a channel list information request to the message application server 300 via HTTP communication. Specifically, the token information 604 stored in advance in association with the user and information indicating a request for a channel list in the workspace specified by the token information 604 is transmitted to the message application server 300. An example of a command to be transmitted is "HTTP GET https://message.com/api/channels.list". The URL "https://message-.com/api/channels.list" in the command is a URL for access to the message application server 300. By transmitting the token information 604 to the URL, the message application server 300 searches for a workspace and a bot application that correspond to the token information 604. The token information 604 is stored in association with the MFP-user ID 602 of the user using the MFP 101.

As used herein, the term "workspace" refers to something similar to an organization to which a plurality of users belongs in a message application. Further, the term "channel" refers to something similar to a chat room in a workspace. As used herein, the term "chat room" refers to a system in which a plurality of users participating in the chat room transmits and receives messages as though they are chatting. While the channel is described as a chat room in the present exemplary embodiment, the channel is not limited to a chat room and can be any system in which a plurality of users transmits and receives messages as though they are chatting. For example, the channel can be a group chat, a room, a talk room, or a group.

The bot application is an application for registering the MFP 101 as a user in the message application and for posting messages and image data. The bot application is installed in the message application server 300. If image data is transmitted to the message application server 300 with the bot application being designated, the bot application posts the transmitted image data using the message application. Further, the HDD 305 of the message application server 300 stores the bot application and a token in association and stores the bot application and the workspace in association. Thus, if the message application server 300 receives the token information 604 from the MFP 101, the message application server 300 returns information about the workspace associated with the bot application associated with the token information 604. Alternatively, the token information 604, the bot application, and the workspace can be directly associated. This way, the workspace (workspace to which the user desires to transmit image data) that corresponds to the preregistered token information 604 is selected from a large number of workspaces.

In step S1102, the CPU 301 of the message application server 300 refers to the token information 604 received via the communication unit 304 and searches the HDD 305 for the bot application and the workspace information contained in the token information 604.

In step S1103, the CPU 301 of the message application server 300 checks whether access to the URL is allowed based on the token information 604 received from the MFP 101 via the communication unit 304. In a case where access is allowed, channel list information about a list of channels contained in the workspace corresponding to the token information 604 is generated. The channel list information is arrangement information that indicates channel information. The channel information contains a channel ID, a channel name, an APP-user ID of each user participating in the channel, and a channel setting value indicating a setting as to whether the channel is an archive channel.

In step S1104, the CPU 301 of the message application server 300 controls the communication unit 304 and transmits the channel list information to the MFP 101 as HTTP communication response information.

In step S1105, the CPU 111 of the MFP 101 displays only the channel to which the APP-user ID 603 associated with the MFP-user ID 602 of the user that is currently logging in relates among the received channel list information on the channel selection screen 1014.

In step S1106, the CPU 111 of the MFP 101 generates the channel selection screen 1014 based on the new channel list information generated in step S1105. Then, if the CPU 111 of the MFP 101 detects the press of the channel selection button 1013 via the operation unit 116, the CPU 111 displays the channel selection screen 1014 on the touch panel 501 and waits for a user operation.

In step S1107, if the CPU 111 of the MFP 101 detects the selection of at least a channel on the channel selection screen 1014 and the press of the return button 1015 via the operation unit 116, the CPU 111 determines post destination channel information.

In step S1108, the CPU 111 of the MFP 101 receives a scan execution instruction via the operation unit 116.

In step S1109, the CPU 111 of the MFP 101 performs scanning using the scan setting at the time of the reception of the scan execution instruction.

In step S1110, the CPU 111 of the MFP 101 generates a scanned image as image data in a format that is set in the scan setting. The scan setting that is designated by the user on a scan-to-chat details setting screen (not illustrated) is used. Further, the scan setting can be displayed together with the transmission setting on the transmission setting screen 1012 in FIG. 11B and set.

In step S1111, the CPU 111 of the MFP 101 transmits information specified below to the message application server 300 via the communication unit 126. The information to be transmitted is the token information 604, which is the same that as in step S1101, information about the post destination channel selected in step S1107, a file format, and HTTP communication information about the image data generated in step S1110. As to the file format, the file format that is designated by the user on the transmission setting screen 1012 of scan-to-chat is used.

In step S1112, the CPU 301 of the message application server 300 searches for workspace information and application information that are registered with the token information 604 received in step S1111, and stores the received image data in association with the channel designated by the channel information. Further, in a case where a user of the post destination is designated, the received image data is stored in association with the channel and the user of the post destination. This way, if the user activates the message application on the mobile terminal 200 and designates the channel to check the content of previous conversations in the channel, a screen with the received image data posted is displayed.

In step S1113, the CPU 301 of the message application server 300 transmits a result indicating whether the posting is successfully performed to the MFP 101 as HTTP communication response information. In a case where the posting is successfully performed, the CPU 111 of the MFP 101 may display a notification that the posting is successfully performed on the touch panel 501. On the other hand, in a case where the posting is not successfully performed, the CPU 111 of the MFP 101 may display a posting error notification on the touch panel 501. Alternatively, a posting error notification may be displayed only in a case where the positing is not successfully performed, while no notifications are displayed in a case where the posting is successfully performed.

Figure 13:
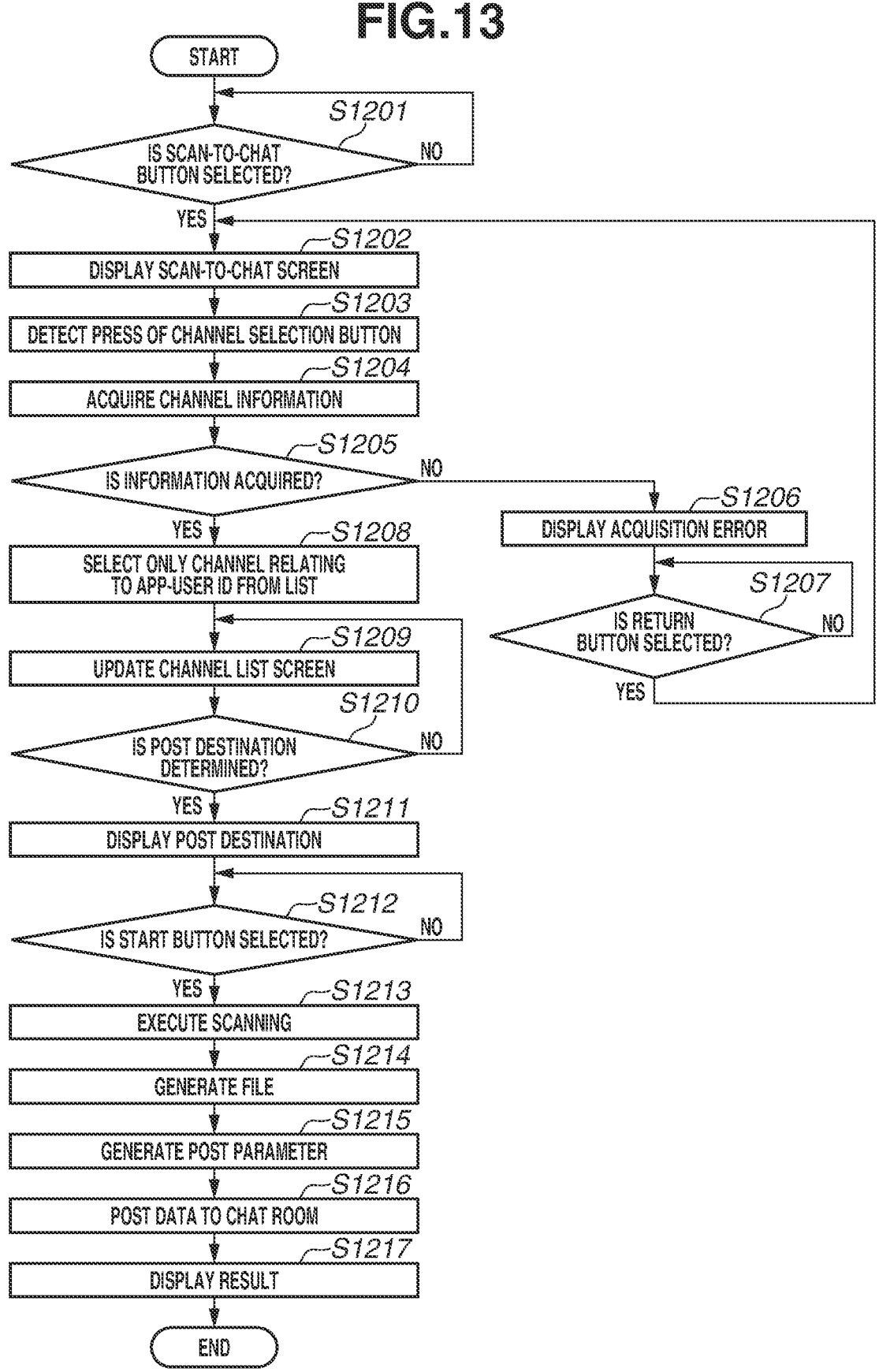
FIG. 13 is a flowchart illustrating an example of a scan-to-chat process that is performed by the MFP.

FIG. 13 is a flowchart illustrating an example of a scan-to-chat process that is performed by the MFP 101. The flowchart is started when the MFP 101 is turned on, and the CPU 111 reads a program stored in the ROM 112 onto the RAM 113 and executes the program to thereby perform the process illustrated in the flowchart in FIG. 13. As a condition of a start of the flowchart, the MFP-user ID 602 is stored in advance in the storage 114 through a login authentication process.

In step S1201, the CPU 111 determines whether the scan-to-chat button 502 is selected. In a case where the CPU 111 determines that the scan-to-chat button 502 is selected (YES in step S1201), the processing proceeds to step S1202. Otherwise (NO in step S1201), the processing returns to step S1201.

In step S1202, the CPU 111 displays the scan-to-chat screen 1004 on the touch panel 501.

In step S1203, the CPU 111 detects the selection of the channel selection button 1013.

In step S1204, since the channel selection button 1013 is selected, the CPU 111 performs the following processing. Specifically, the CPU 111 transmits information indicating a request for channel information via HTTP communication using the token information 604 associated with the MFP-user ID 602 stored in the RAM 113 to the message application server 300.

In step S1205, the CPU 111 determines whether channel information is received from the message application server 300 in response to the channel acquisition request transmitted in step S1204. Specifically, in a case where a status code in an HTTP communication response is an error or in a case where response body information contains a parameter indicating that information cannot be acquired, the CPU 111 determines that channel information list is not received. In a case where the CPU 111 determines that channel information is received (YES in step S1205), the processing proceeds to step S1208. Otherwise (NO in step S1205), the processing proceeds to step S1206.

In step S1206, the CPU 111 displays information indicating that channel list information is not received on the channel selection screen 1014. At this time, no channel options or user options are displayed on the channel selection screen 1014.

In step S1207, the CPU 111 determines whether the return button 1015 is selected. In a case where the CPU 111 determines that the return button 1015 is selected (YES in step S1207), the processing returns to step S1202. Otherwise (NO in step S1207), the processing returns to step S1206.

In step S1208, the CPU 111 selects only the channel to which the APP-user ID 603 associated with the MFP-user ID 602 stored in the RAM 113 relates, from the channel information acquired in step S1204.

In step S1209, the CPU 111 displays the channel selection screen 1014 on the touch panel 501. The channel selection screen 1014 displays the channel information selected in step S1208.

In step S1210, the CPU 111 detects whether the post destination (a channel, or a channel and a user) selected on the channel selection screen 1014 is determined via the touch panel 501 of the operation unit 116. In a case where the post destination is determined (YES in step S1210), the processing proceeds to step S1211, and the channel list information on posting is updated. On the other hand, in a case where the post destination is not determined, (NO in step S1210), the processing proceeds to step S1209. The determination detection is based on whether the return button 1015 is selected. In a case where a determination button is displayed on a screen of the touch panel 501, the processing proceeds as described above based on the selection of the determination button.

In step S1211, the CPU 111 displays the scan-to-chat screen 1004 on the touch panel 501 and updates the display of the post destination section 1016 with the post destination determined in step S1210. At this time, information about a user to be notified is also displayed together with the post destination channel.

In step S1212, the CPU 111 determines whether the monochrome scanning start button 1009 or the color scanning start button 1010 displayed on the touch panel 501 is selected. In a case where the CPU 111 determines that the monochrome scanning start button 1009 or the color scanning start button 1010 is selected (YES in step S1212), the processing proceeds to step S1213. Otherwise (NO in step S1212), the processing returns to step S1212.

In step S1213, the CPU 111 controls the reading unit 118, reads a document image, and generates image data based on the scan setting. As to the scan setting, the scan setting that is designated by the user on the scan-to-chat details setting screen (not illustrated) is used.

In step S1214, the CPU 111 converts the image data generated in step S1213 into the file format 1017 set on the transmission setting screen 1012.

In step S1215, the CPU 111 generates post parameters. The post parameters include a post destination channel, a file format, a file name, and a post comment. As to the file format, the file format that corresponds to the file format 1017 set in the transmission settings is set. As to the post comment, characters with the "@" symbol at the beginning of the user information to be notified are generated. As to the file name, the file name that is designated in the transmission settings is designated.

In step S1216, the CPU 111 transmits the file generated in step S1214 and the post parameters using the token information 604 registered in advance to the message application server 300 by the POST method of HTTP communication. The data (the file generated by converting the image data and the post parameters) is transmitted to the message application server 300 so that the message application server 300 controls the received file to be posted to the received user of the received channel.

In step S1217, the CPU 111 receives a post result from the message application server 300 and displays the post result on the touch panel 501.

With the above-described process, a user can post a file from the MFP 101 with ease to a channel in a server that the user relates to.

An example of a screen that is displayed on the operation panel 201 of the mobile terminal 200 as a result that the file generated by converting the image data and the post parameters are transmitted to the message application server 300 in step S1216 will be described below with reference to FIG. 14.

Figure 14:
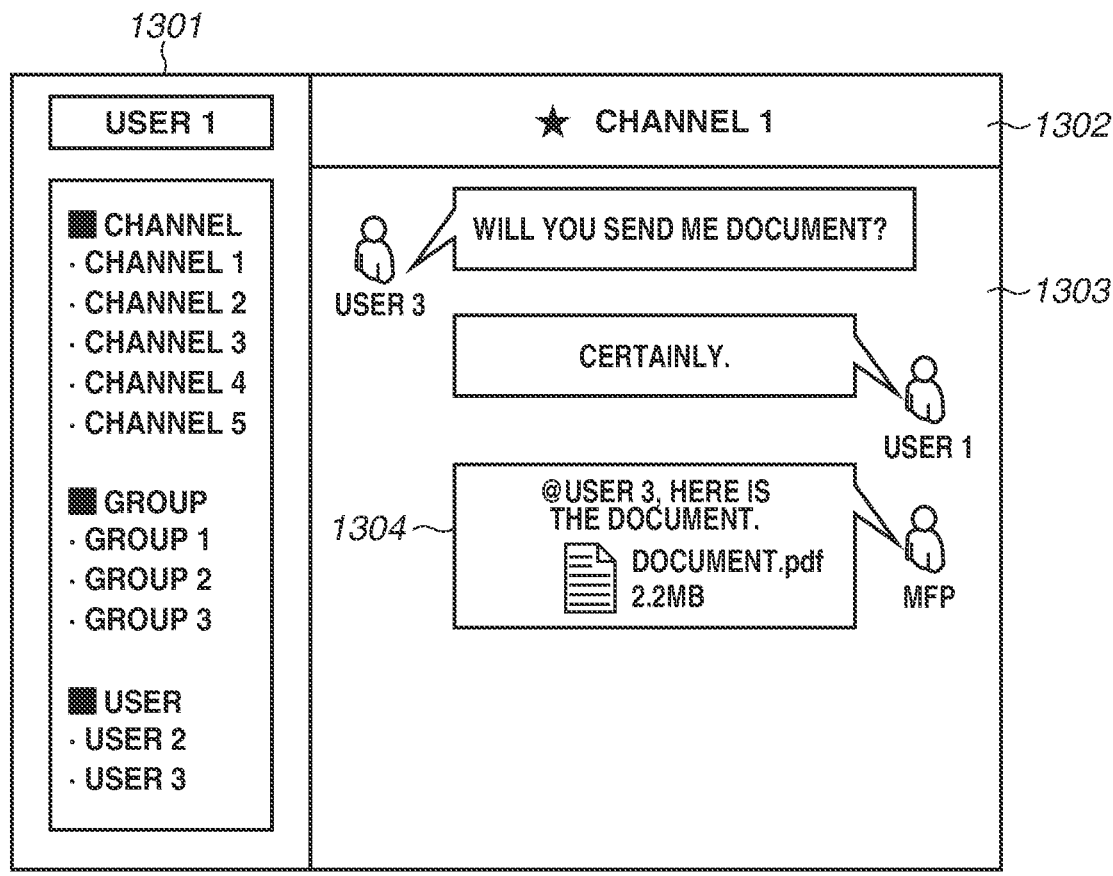
FIG. 14 illustrates an example of a message screen of a message application.

FIG. 14 illustrates an example of a message screen of the message application. A message application screen 1301 in FIG. 14 is displayed if the message application is activated on the mobile terminal 200 and step S1015 is executed on the MFP 101. Further, the mobile terminal 200 is in communication with the message application server 300.

If the user activates the message application on the mobile terminal 200 and logs in by inputting the login ID and the password of the account of the user, a dedicated screen for the user is displayed.

A message 1304 is a message that is displayed (posted) if a user having an account of "user 1" transmits image data generated by scanning and the post parameters to the message application server 300 using the MFP 101. In the example illustrated in FIG. 14, "channel 1" is designated as the post channel of the post parameters, and "user 3" belonging to the channel 1 is designated as the user. Further, "document.pdf" is designated as the file name of the post parameters, and "Here is the document." is designated as the comment. The file name and the comment are designated by the user on the scan-to-chat details setting screen (not illustrated).

Further, the message application screen 1301 displays channels in which the user that logs in participates, groups, and users are displayed. Further, partner information (1302) and exchanged messages (1303) are displayed. In posting, the comment with the "@" symbol at the beginning of the username indicates that the poster desires to notify the comment especially to the designated user of the channel (1304). In the case illustrated in FIG. 14, the user 3 is notified of the post reception faster than the other members belonging to the channel by a message application viewing terminal. In a case where the mobile terminal 200 viewed by the user 3 is a smartphone, the user is notified by an icon notification function, a vibration, or a ringtone. In a case where the mobile terminal 200 viewed by the user 3 is a desktop terminal, the user is notified by a desktop notification function.

Figure 15:
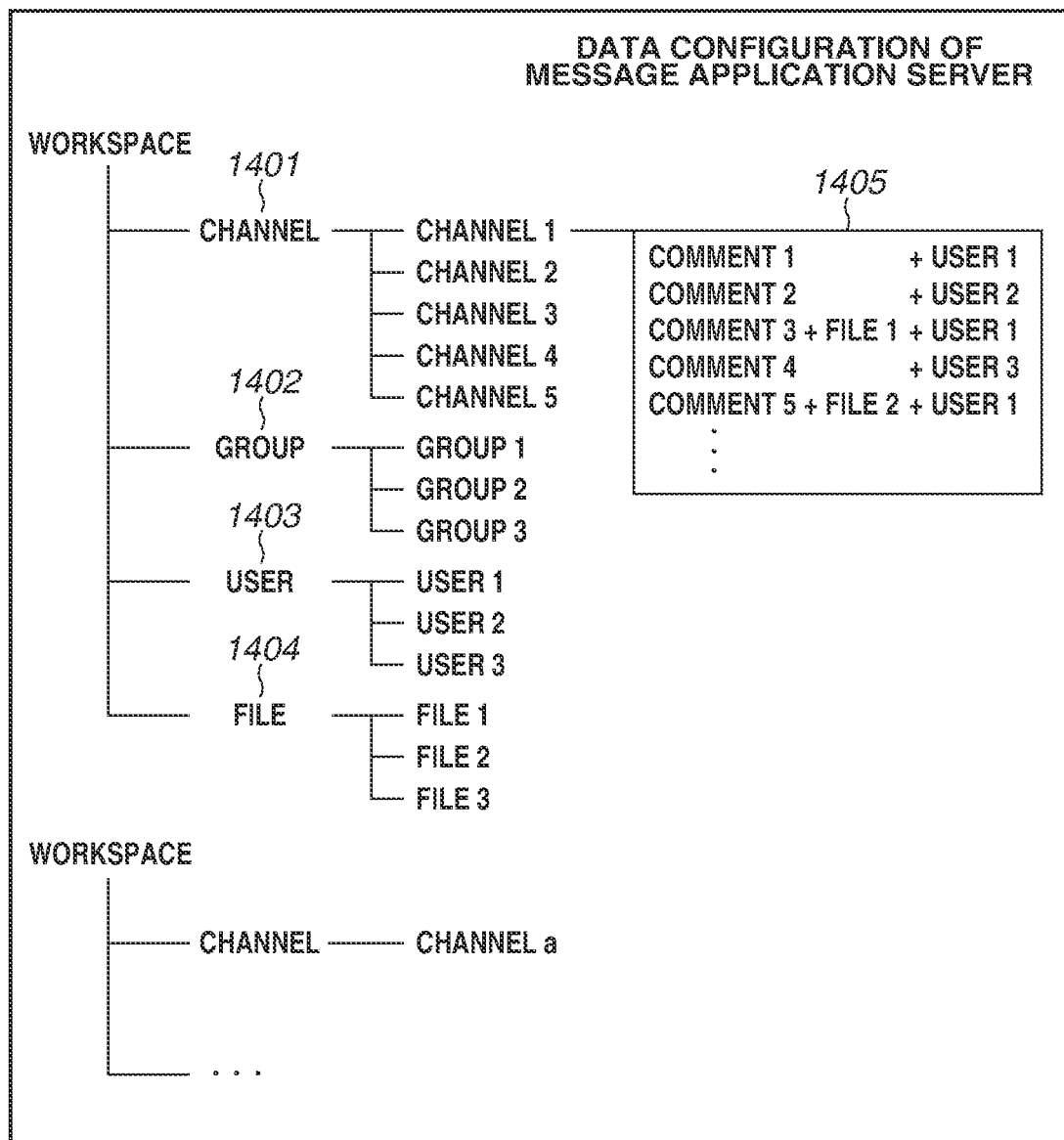
FIG. 15 illustrates an example of a file configuration in the message application server.

In displaying the message application screen 1301, the message application server 300 searches for necessary information from the data configuration illustrated in FIG. 15 and displays the information. For example, the posted message 1304 corresponds to "comment 3+ file 1" of communication content 1405, and attribute information such as the name of the file 1 is acquired from a file 1404 and displayed in the form of a file icon on the message 1304. If the user selects the file icon, the file 1 belonging to the file 1404 is acquired. While the file posted to the channel 1 is displayed as the icon in FIG. 14, a preview image of the file can be displayed.

FIG. 15 illustrates an example of a file configuration in the message application server 300. The file configuration is stored in the HDD 305 of the message application server 300, and the screen illustrated in FIG. 14 is displayed based on the file configuration. The message application server 300 manages data with small blocks, such as a channel 1401, a group 1402, a user 1403, and a file 1404, in a workspace block, which is the largest block. The channel 1401 is a chat room that every member of the workspace can participate in, and all the content posted to the chart room can be searched by anybody. The group 1402 is a channel for discussions that should not be open to all the members, and invitation is required for viewing and participation. The user 1403 includes users participating in the workspace. The file 1404 stores attached files. Further, the communication content 1405 in the channel 1401 is stored in association with the channel 1401, the communication content 1405 in the group 1402 is stored in association with the group 1402, and the communication content 1405 in the user 1403 is stored in association with the user 1403. For example, the users participating in the channel 1 are stored in association with the channel 1. Further, the messages and image data exchanged in the channel 1 are stored in association with the channel 1. The data is stored as described above so that when a channel is selected on the channel selection screen 1014, users corresponding to the designated channel information are displayed.

Executing the above-described processing reduces the possibility of a leak of authentication information for a chat service while making it easy for users to search for talk rooms in designating a talk room to display image data generated by an image processing apparatus.

While the example in which the channel selection screen 1014 displays only the channels to which an account used in the chat service by the user having logged in to the MFP 101 belongs is described in the present exemplary embodiment, the present exemplary embodiment is not limited to the example. For example, a setting to select whether to display only the channels to which the account used in the chat service by the user having logged in to the MFP 101 belongs can be set. In a case where the setting is not set to display only the channels to which the account used in the chat service by the user having logged in to the MFP 101 belongs, all the channels corresponding to the workspace corresponding to the token information 604 transmitted in step S1101 are displayed. The channels corresponding to the workspace corresponding to the token information 604 transmitted in step S1101 include the channel to which the account used by the user in the chat service belongs.

In the first exemplary embodiment, the example in which the MFP 101 transmits image data and post parameters directly to the message application server 300 is described.

In a second exemplary embodiment, an example in which the MFP 101 transmits image data and post parameters to the message application server 300 via the bot server 400 will be described. In the present exemplary embodiment, an example in which the HDD 405 of the bot server 400 stores the table 601 described in the first exemplary embodiment will be described. Each process of generating the table 601 in FIGS. 8 and 9 according to the first exemplary embodiment is applicable by replacing the MFP 101 by the bot server 400 and replacing the CPU 111 of the MFP 101 by the CPU 401 of the bot server 400, so that redundant descriptions thereof are omitted.

FIG. 16 illustrates an example of a sequence of transmitting a file generated by scanning by the MFP 101 to the message application server 300 via the bot server 400. The sequence illustrated in FIG. 16 is started when the channel selection button 1013 on the scan-to-chat screen 1004 in FIG. 11A is selected.

In step S1501, the CPU 111 of the MFP 101 transmits the MFP-user ID 602 and information indicating a request for the channel list information via HTTP communication to the bot server 400.

In step S1502, the CPU 401 of the bot server 400 selects the token information 604 that corresponds to the received MFP-user ID 602 from the table 601. Then, the CPU 401 transmits the information indicating a request for the channel list information via HTTP communication and the token information 604 to the message application server 300.

In step S1503, the CPU 301 of the message application server 300 searches for the workspace information and the bot application that are registered based on the token information 604.

In step S1504, the CPU 301 of the message application server 300 checks whether the URL executed is allowed based on the application information, and in a case where the URL is allowed, the CPU 301 generates channel list information about a list of channels that belong to the workspace. The channel list information is arrangement information about channel information. The channel information contains a channel ID, a channel name, a list of an APP-user ID of each member belonging to the channel, and a setting value indicating whether the channel is an archive channel.

In step S1505, the CPU 301 of the message application server 300 controls the communication unit 304 and transmits the channel list information as HTTP communication response information to the bot server 400.

In step S1506, the CPU 401 of the bot server 400 selects a channel to which the APP-user ID 603 associated with the MFP-user ID 602 received in step S1501 relates from the received channel list information. Then, the CPU 401 generates a channel list to be transmitted to the MFP 101.

In step S1507, the CPU 401 of the bot server 400 transmits the channel list information generated in step S1506 as an HTTP communication response to the MFP 101. Further, the CPU 111 of the MFP 101 displays the channels contained in the received channel list information on the channel selection screen 1014.

Steps S1508 to S1512 are similar to steps S1106 to S1110 in FIG. 12, so that redundant descriptions thereof are omitted.

In step S1513, the CPU 111 of the MFP 101 transmits the MFP-user ID 602, post destination channel information, file format information, and image data to the bot server 400 via HTTP communication.

In step S1514, the CPU 401 of the bot server 400 performs the following processing. Specifically, the CPU 401 transmits the received post destination channel information, the received file format information, the received image data, and the token information 604 corresponding to the received MFP-user ID 602 to the message application server 300.

Step S1515 is similar to step S1112, so that redundant descriptions thereof are omitted.

In step S1516, the CPU 301 of the message application server 300 transmits a result indicating whether the posting is successfully performed as HTTP communication response information to the bot server 400.

In step S1517, the CPU 401 of the bot server 400 transmits a result indicating whether the posting is successfully performed as HTTP communication response information to the MFP 101. In a case where the posting is successfully performed, the CPU 111 of the MFP 101 displays a notification that the posting is successfully performed on the touch panel 501. On the other hand, in a case where the posting is not successfully performed, the CPU 111 of the MFP 101 displays a posting error notification on the touch panel 501. Alternatively, a posting error notification may be displayed only in a case where the positing is not successfully performed, while no notifications are displayed in a case where the posting is successfully performed.

Further, while the channel list is acquired in the present exemplary embodiment, a limited-access group list and an individual post user list can be posted by a similar method.

FIG. 17 is a flowchart illustrating an example of a scan-to-chat process. The CPU 111 reads a program stored in the ROM 112 onto the RAM 113 and executes the program to thereby perform the process illustrated in the flowchart in FIG. 17. Further, the process illustrated in FIG. 17 is started when the MFP 101 is turned on.

Steps S1701 to S1703 are similar to steps S1201 to S1203, so that redundant descriptions thereof are omitted.

In step S1704, the CPU 111 acquires the MFP-user ID 602 and transmits a channel information acquisition request and the MFP-user ID 602 to the bot server 400 via HTTP communication.

Steps S1705 to S1707 are similar to steps S1205 to S1207, so that redundant descriptions thereof are omitted. Further, the processing corresponding to step S1208 is performed by the bot server 400 and is thus not performed by the MFP 101 in the present exemplary embodiment. Steps S1708 to S1714 thereafter are similar to steps S1209 to S1215, so that redundant descriptions thereof are omitted.

In step S1715, the CPU 111 transmits the MFP-user ID 602 and the file generated in step S1713 and the post parameters. While the example in which the file is transmitted to the message application server 300 using the token information 604 registered in advance is described in the first exemplary embodiment, this is not a limiting example. For example, the storage 114 of the MFP 101 only stores token information, and a request or file transmission is executed using the token information selected by the user.

In step S1716, the CPU 111 receives a post result from the message application server 300 and displays the post result on the touch panel 501.

While the MFP-user ID 602 is used in the communication with the bot server 400 in the present exemplary embodiment, any uniquely-determined identifiers such as a tenant ID can be used.

FIG. 18 is a flowchart illustrating an example of a process in transmitting image data to the message application server 300 by the bot server 400. The CPU 401 reads a program stored in the ROM 402 onto the RAM 403 and executes the program to thereby execute the process illustrated in the flowchart in FIG. 18. Further, the process illustrated in FIG. 18 is started when the bot server 400 is turned on.

In step S1801, the CPU 401 determines whether the MFP-user ID 602 and an information acquisition request to acquire channel information are received from the MFP 101. In a case where the CPU 401 determines that the MFP-user ID 602 and the information acquisition request are received (YES in step S1801), the processing proceeds to step S1802. Otherwise (NO in step S1801), the processing returns to step S1801.

In step S1802, the CPU 401 acquires the token information 604 corresponding to the MFP-user ID 602 received from the MFP 101.

In step S1803, the CPU 401 determines whether there is the token information 604 corresponding to the received MFP-user ID 602 based on the table 601. In a case where the CPU 401 determines that there is the token information 604 (YES in step S1803), the processing proceeds to step S1804. Otherwise (NO in step S1803), the processing proceeds to step S1807. Further, in the case where the CPU 401 determines that there is the token information 604, the RAM 403 stores the received MFP-user ID 602.

In step S1804, the CPU 401 transmits the information acquisition request received from the MFP 101 in step S1801 to the message application server 300 using the token information 604 specified in step S1803.

In step S1805, the CPU 401 determines whether the channel list information is returned from the message application server 300. In a case where the CPU 401 determines that the channel list information is returned (YES in step S1805), the processing proceeds to step S1806. On the other hand, in a case where the CPU 401 determines that the channel list information is not returned (NO in step S1805), the processing returns to step S1805.

In step S1806, the CPU 401 transmits the channel list information containing the channels corresponding to the APP-user ID 603 associated with the MFP-user ID 602 from the received channel list information to the MFP 101, and the process ends. The channel list does not include channels that do not correspond to the APP-user ID 603.

In step S1807, the CPU 401 transmits information indicating an execution error to the MFP 101 in response to the request received in step S1801, and the process ends.

The process illustrated in FIG. 18 is an example in a case where the MFP-user ID 602 and the information acquisition request that are transmitted in step S1501 in the sequence in FIG. 16 are received. In a case where the MFP-user ID 602, the file (image data), and the post destination channel information that are transmitted in step S1513 are received, a process similar to that illustrated in FIG. 18 is performed. Specifically, in a case where there is the token information 604 corresponding to the received MFP-user ID 602, the token information 604, the post destination channel information, and the file (image data) are transmitted to the message application server 300. On the other hand, in a case where there is no token information 604 corresponding to the received MFP-user ID 602, information indicating an error is transmitted to the MFP 101.

According to the present exemplary embodiment, even in a case where an interface specification of the message application server 300 is changed, posting is realized simply by updating a program of the bot server without uploading a program of the MFP 101. Further, in an office with a plurality of MFPs, a file can be posted without individually making a token setting to each MFP.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that communicates with a server that manages a chat service, the image processing apparatus comprising:
    a display;
    a scanner that scans a document to generate image data;
    a controller,
    wherein the controller receives user information; and
    a communicator that receives, from the server, a plurality of pieces of information indicating channels of the chat service managed by the server, the channels including one or more channels in which a user corresponding to the received user information cannot post a message,
    wherein the controller specifies one or more channels in which the user indicated by the received user information can post a message from the channels indicated by the received plurality of pieces of information,
    wherein the controller controls the display to display the specified one or more channels of the channels indicated by the received plurality of pieces of information and not to display one or more channels that is not specified by the controller of the channels indicated by the received plurality of pieces of information,
    wherein the controller receives a selection of a channel from the displayed one or more channels, and
    wherein the communicator transmits the generated image data and information of the selected channel to the server, the generated image data being stored in associated with the selected channel.

2. The image processing apparatus according to claim 1, wherein if the controller receives a selection of a channel from the displayed one or more channels, the controller controls the display to display information indicating the selected channel as a store destination of the generated image data.

3. The image processing apparatus according to claim 1, further comprising:
    a user interface,
    wherein the controller further receives the user information via the user interface.

4. The image processing apparatus according to claim 3,
    wherein the communicator transmits the received user information to the server,
    wherein the communicator receives identification information corresponding to the received user information from the server, and
    wherein the controller, by using the received identification information, specifies the one or more channels in which the user indicated by the received user information can post a message from the channels indicated by the received plurality of pieces of information.

5. The image processing apparatus according to claim 3, wherein the controller receives one execution instruction via the user interface, and
    wherein, based on the received one execution instruction, the scanner scans the document to generate image data and then the communicator transmits the generated image data and the information of the selected channel to the server.

6. The image processing apparatus according to claim 1, further comprising a printer that prints an image on a sheet.

7. The image processing apparatus according to claim 1, wherein the controller receives a file name from a user, and
    wherein the communicator transmits the generated image data having the received file name and the information of the selected channel to the server.

8. A non-transitory computer-readable storage medium storing a program that, when executed by an image processing apparatus, causes the image processing apparatus to perform a method of controlling an image processing apparatus that communicates with a chat server and includes a display and a scanner that scans a document to generate image data, the method comprising:
    receiving, from the server, a plurality of pieces of information indicating channels of the chat service managed by the server, the channels including one or more channels in which a user corresponding to the received user information cannot post a message;
    specifying one or more channels in which the user indicated by the received user information can post a message from the channels indicated by the received plurality of pieces of information;
    controlling the display to display the specified one or more channels of the channels indicated by the received plurality of pieces of information and not to display one or more channels that is not specified of the channels indicated by the received plurality of pieces of information;
    receiving a selection of a channel from the displayed one or more channels; and
    transmitting the generated image data and information of the selected channel to the server, the generated image data being stored in associated with the selected channel.

9. The non-transitory computer-readable storage medium according to claim 8, wherein if a channel is selected from the displayed one or more channels, information indicating selected channel is displayed as a store destination of the generated image data.

10. The non-transitory computer-readable storage medium according to claim 8,
wherein the image processing apparatus further includes a user interface, and
wherein the user information is received via the user interface.

11. The non-transitory computer-readable storage medium according to claim 10,
wherein the received user information is transmitted to the server,
wherein identification information corresponding to the received user information is received from the server, and
wherein the one or more channels in which the user indicated by the received user information can post a message from the channels indicated by the received plurality of pieces of information is specified by using the received identification information.

12. The non-transitory computer-readable storage medium according to claim 10, the method further comprising:
receiving one execution instruction via the user interface,
wherein, based on the received one execution instruction, the scanner scans the document to generate image data and then the generated image data and the information of the selected channel are transmitted to the server.

13. The non-transitory computer-readable storage medium according to claim 8, wherein the image processing apparatus includes a printer that prints an image on a sheet.

14. The non-transitory computer-readable storage medium according to claim 8, the method further comprising:
receiving a file name from a user,
wherein the generated image data having the received file name and the information of the selected channel is transmitted to the server.

15. A method of controlling an image processing apparatus that communicates with a chat server and includes a display and a scanner that scans a document to generate image data, the method comprising:
receiving, from the server, a plurality of pieces of information indicating channels of the chat service managed by the server, the channels including one or more channels in which a user corresponding to the received user information cannot post a message;
specifying one or more channels in which the user indicated by the received user information can post a message from the channels indicated by the received plurality of pieces of information;
controlling the display to display the specified one or more channels of the channels indicated by the received plurality of pieces of information and not to display one or more channels that is not specified of the channels indicated by the received plurality of pieces of information;
receiving a selection of a channel from the displayed one or more channels, and
transmitting the generated image data and information of the selected channel to the server, the generated image data being stored in associated with the selected channel.

* * * * *